United States Patent
Horiuchi et al.

(10) Patent No.: US 7,333,348 B2
(45) Date of Patent: Feb. 19, 2008

(54) DC-DC CONVERTER

(75) Inventors: Shoji Horiuchi, Numazu (JP); Yoshimichi Nakamura, Numazu (JP); Nozomi Tan, Numazu (JP)

(73) Assignees: Mitsui & Co., Ltd., Tokyo (JP); Winz Corporation, Shizuoka (JP)

( * ) Notice: Subject to any disclaimer, the term of this patent is extended or adjusted under 35 U.S.C. 154(b) by 0 days.

(21) Appl. No.: 11/447,387

(22) Filed: Jun. 6, 2006

(65) Prior Publication Data

US 2006/0227577 A1    Oct. 12, 2006

Related U.S. Application Data

(63) Continuation of application No. PCT/JP2005/004824, filed on Mar. 17, 2005.

(30) Foreign Application Priority Data

| Mar. 18, 2004 | (JP) | ............................. 2004-119652 |
| Sep. 17, 2004 | (JP) | ............................. 2004-272503 |

(51) Int. Cl.
    *H02M 3/335* (2006.01)
(52) U.S. Cl. ........................... 363/16; 363/132; 363/98
(58) Field of Classification Search ............ 363/16–20, 363/97, 21.02, 71, 132, 65, 67, 95, 37
    See application file for complete search history.

(56) References Cited

U.S. PATENT DOCUMENTS 6,344,979 B1 *  2/2002  Huang et al. .................. 363/16
6,747,883 B2 *  6/2004  Yasumura ..................... 363/98
6,917,531 B2 *  7/2005  Scheel et al. .................. 363/97

FOREIGN PATENT DOCUMENTS

| JP | 6-090567 A | 3/1994 |
| JP | 6-165486 A | 6/1994 |
| JP | 9-093922 A | 4/1997 |

(Continued)

OTHER PUBLICATIONS

English translation of International Preliminary Report on Patentability Issued by International Bureau of WIPO on Sep. 19, 2006 in connection with PCT No. PCT/JP2005/004824.

(Continued)

*Primary Examiner*—Rajnikant B. Patel
(74) *Attorney, Agent, or Firm*—John P. White; Cooper & Dunham LLP

(57) ABSTRACT

There is provided a high-efficiency DC-DC converter which comprises a voltage resonance circuit to which electric power from a low-voltage direct-current power supply, including a household fuel cell and a solar cell, is input and performs DC-AC conversion by zero-voltage switching, an insulating high-frequency transformer which transmits the converted power, a current resonance circuit which is provided on the secondary side of the transformer and performs zero-current switching, a rectifier circuit which rectifies the output from the current resonance circuit, and a smoothing circuit which rectifies the output from the rectifier circuit.

11 Claims, 17 Drawing Sheets

FOREIGN PATENT DOCUMENTS

| | | |
|---|---|---|
| JP | 9-163734 A | 6/1997 |
| JP | 2000-166241 A | 6/2000 |
| JP | 2001-128452 A | 5/2001 |
| JP | 2002-199719 A | 7/2002 |
| JP | 2003-304688 A | 10/2003 |
| JP | 2003-319654 A | 11/2003 |

OTHER PUBLICATIONS

International Search Report issued by the International Searching Authority (ISA/JP) on Jul. 5, 2005 in connection with International application No. PCT/JP2005/004824.

Kosuke Harada (Editor-in-chief), Soft Switching Power Supply Technology, published by Nikkan Kogyo Shimbun Ltd. on Dec. 25, 1999 (Japan), pp. 125-127.

* cited by examiner

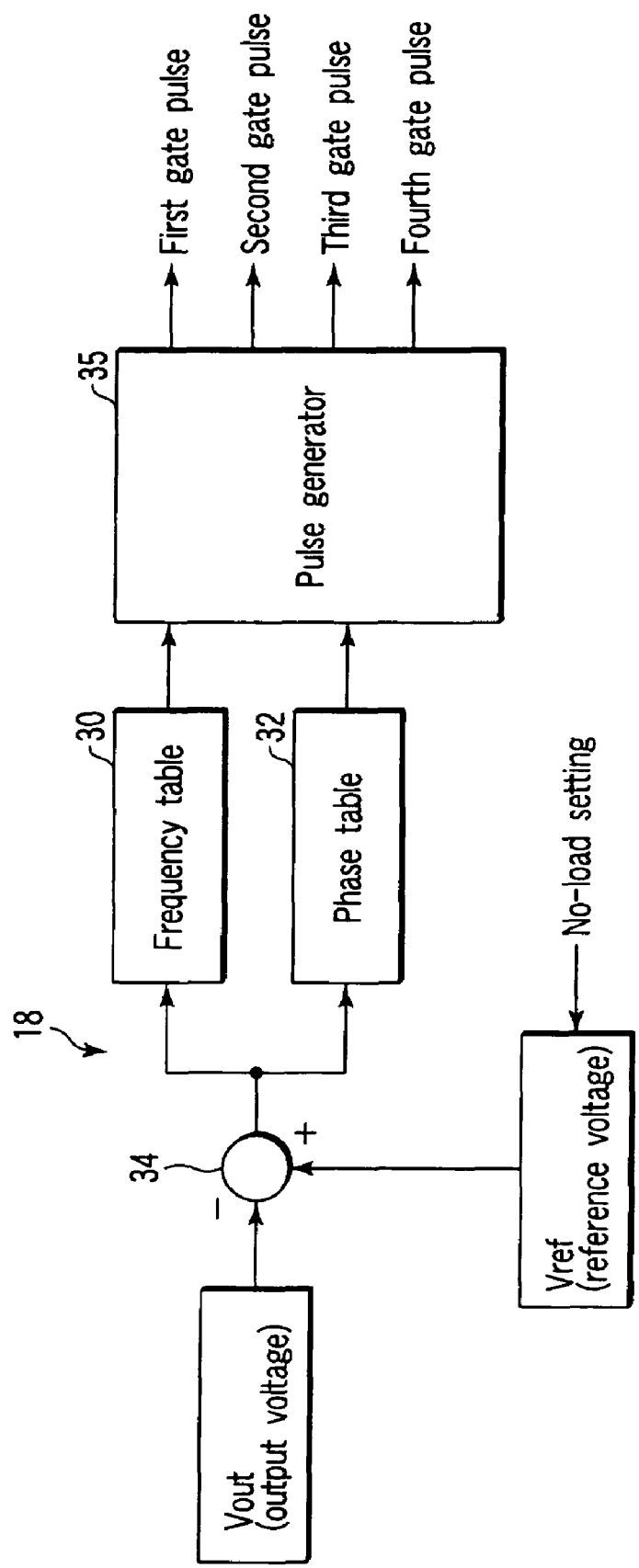
F I G. 10

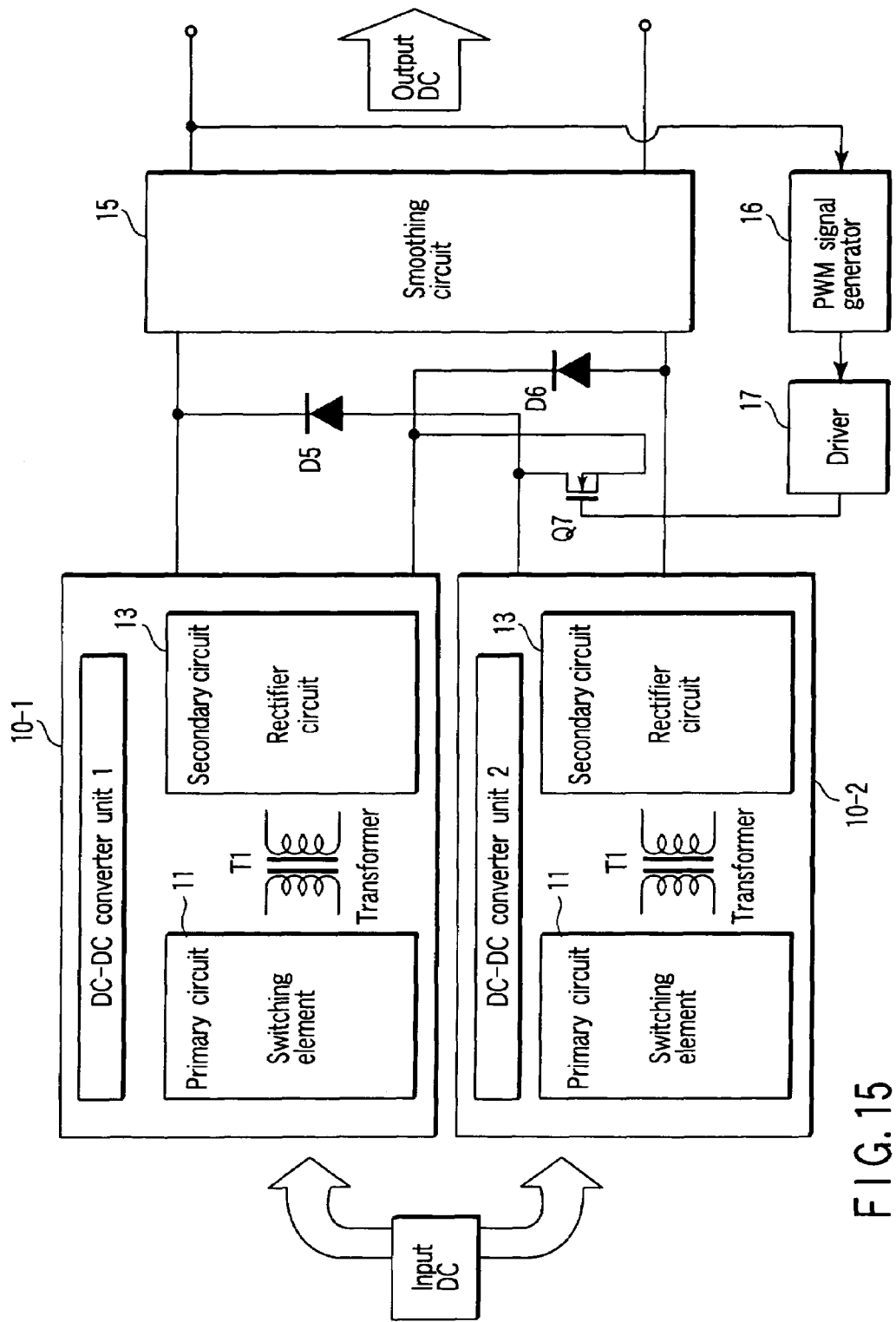
F I G. 15

DC-DC CONVERTER

CROSS REFERENCE TO RELATED APPLICATIONS

This is a Continuation Application of PCT Application No. PCT/JP2005/004824, filed Mar. 17, 2005, which was published under PCT Article 21(2) in Japanese.

This application is based upon and claims the benefit of priority from prior Japanese Patent Applications No. 2004-119652, filed Mar. 18, 2004; and No. 2004-272503, filed Sep. 17, 2004, the entire contents of both of which are incorporated herein by reference.

BACKGROUND OF THE INVENTION

1. Field of the Invention

This invention relates to a DC-DC converter. More particularly, this invention relates to an insulating DC-DC converter for a distributed power supply which converts electric power from a distributed direct-current power supply into a medium amount of electric power and an interconnected inverter which uses the DC-DC converter.

2. Description of the Related Art

A distributed power supply system which converts electric power from a distributed direct-current power supply, such as a household fuel cell, a photovoltaic power system, or a wind power system, into a medium amount (0.3 KW to 10 KW) of electric power has a power converter, such as an inverter. In the power converter, the input (primary side) is required to be insulated from the system (secondary side). Use of a high-frequency insulating converter in such a power converter would cause the problem of decreasing efficiency as compared with a non-insulating converter.

Furthermore, since such a power supply as a fuel cell inevitably operates more frequently at an output lower than the rating, the subject of increasing not only efficiency in the aforementioned rated output but also efficiency in an operation at a low output less than 50% of the rated output.

BRIEF SUMMARY OF THE INVENTION

The object of the present invention is to provide a high-efficiency DC-DC converter.

According to an aspect of this invention, there is provided a DC-DC converter characterized by comprising: a voltage resonance circuit to which direct-current power is input from a low-voltage direct-current power supply whose output voltage fluctuates and which performs DC-AC conversion by zero-voltage switching and outputs a high-frequency voltage; an insulating high-frequency transformer which has a primary side and a secondary side and to whose primary side the output voltage from the voltage resonance circuit is input; a current resonance circuit which is connected to the secondary side of the transformer; a rectifier circuit which rectifies the output current output from the current resonance circuit; and a smoothing circuit which smoothes the output voltage from the rectifier circuit.

Furthermore, according to an another aspect of the present invention, there is provided a DC-DC converter characterized by comprising: a first voltage resonance circuit to which direct-current power is input from a low-voltage direct-current power supply whose output voltage fluctuates and which performs DC-AC conversion and outputs the resulting power; a first insulating high-frequency transformer which has a primary side and a secondary side and to whose primary side the output voltage from the first voltage resonance circuit is input; a first current resonance circuit which is connected to the secondary side of the first transformer; a first rectifier circuit which rectifies the output current output from the first current resonance circuit; a first smoothing circuit which smoothes the output voltage from the first rectifier circuit; a second voltage resonance circuit to which direct-current power is input from a low-voltage direct-current power supply whose output voltage fluctuates and which performs DC-AC conversion and outputs the resulting power; a second insulating high-frequency transformer which has a primary side and a secondary side and to whose primary side the output voltage from the secondary voltage resonance circuit is input; a second current resonance circuit which is connected to the secondary side of the second transformer; a second rectifier circuit which rectifies the output current output from the second current resonance circuit; a second smoothing circuit which smoothes the output voltage from the second rectifier circuit; a pulse-width modulation circuit which pulse-width-modulates the output voltages from the first and second rectifier circuits; and a smoothing circuit which smoothes the output voltage from the pulse-width modulation circuit.

Moreover, according to an yet another aspect of the present invention, there is provided a DC-DC converter characterized by comprising: a voltage resonance circuit to which direct-current power is input from a low-voltage direct-current power supply whose output voltage fluctuates and which performs DC-AC conversion and outputs the resulting power; an insulating high-frequency transformer which has a primary side and a secondary side and to whose primary side the output voltage from the first voltage resonance circuit is input; a first and a second current resonance circuit which are connected to the secondary side of the first transformer; a first and a second rectifier circuit which rectify the output currents output from the first and second current resonance circuits; a first and a second smoothing circuit which smooth the output voltages from the first and second rectifier circuits; a pulse-width modulation circuit which pulse-width-modulates the output voltages from the first and second rectifier circuits; and a third smoothing circuit which smoothes the output voltage from the pulse-width modulation circuit.

In addition, according to the a further aspect of present invention, there is provided a DC-DC converter characterized by comprising: a voltage resonance circuit to which direct-current power is input from a low-voltage direct-current power supply whose output voltage fluctuates and which performs DC-AC conversion and outputs the resulting power; a first and a second insulating high-frequency transformer each of which has a primary side and a secondary side and to whose primary side the output voltage from the first voltage resonance circuit is input; a first and a second current resonance circuit which are connected to the secondary sides of the first and secondary transformers respectively; a first and a second rectifier circuit which rectify the output currents output from the first and second current resonance circuits; a first and a second smoothing circuit which smooth the output voltages from the first and second rectifier circuits; a pulse-width modulation circuit which pulse-width modulates the output voltages from the first and second rectifier circuits; and a third smoothing circuit which smoothes the output from the pulse-width modulation circuit.

BRIEF DESCRIPTION OF THE SEVERAL VIEWS OF THE DRAWING

FIG. 10 is a block diagram of the control section showing the function of the MCU of the. DC-DC converter of FIG. 9;

FIG. 15 is a block diagram of a circuit where the converter section of FIG. 1 is composed of two DC-DC converter units;

DETAILED DESCRIPTION OF THE INVENTION

Hereinafter, referring to the accompanying drawings, a DC-DC converter according to an embodiment of the present invention and an interconnected inverter using the DC-DC converter will be explained.

Figure 1:
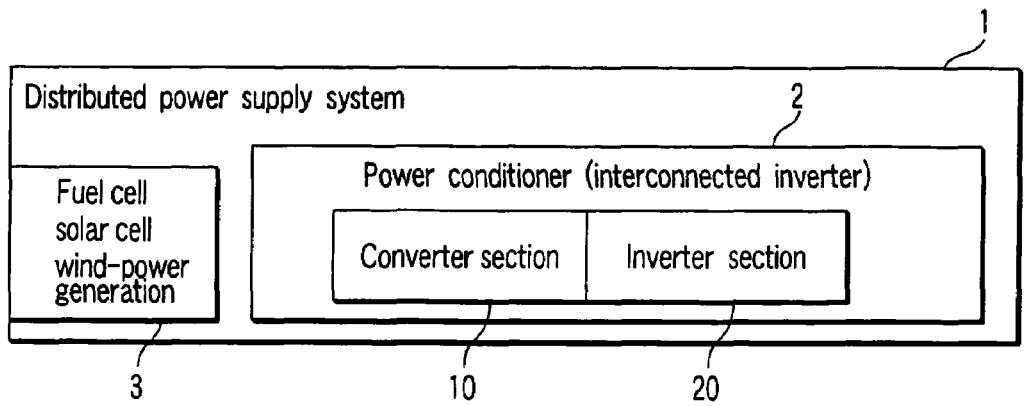
FIG. 1 schematically shows the configuration of a distributed power system to which an interconnected inverter composed of a converter section of this invention and an inverter section is applied.

FIG. 1 schematically shows the configuration of a distributed power system to which an interconnected inverter 2 composed of a converter section 10 (DC-DC converter) according to an embodiment of the present invention and an inverter section 20 that performs DC-AC conversion is applied.

In the distributed power system of FIG. 1, the output (direct-current electric power) of a direct-current power supply 3 whose output fluctuates, such as a fuel cell, a solar cell, or wind-power generation, is input to an interconnected inverter acting as a power conditioner and then is subjected to DC-DC conversion at the converter section of the interconnected inverter. The converted DC output is converted at the inverter section 20 into a relatively small alternating-current output (e.g., about 0.3 kW to several tens of kW). The resulting voltage is output to a load, such as a household load, as commercial voltage (system voltage). Here, the commercial voltage corresponds to 101V or 202V (in single-phase three-wire connection) in Japan and to 115V or 230V in the U.S.

In a fuel cell system, 80V or less, specifically 20V to 60V at present, is input as the input voltage to the converter section 10. The converter section has such a characteristic that its output voltage Vout is the highest with no load and its voltage goes down by about 25% to 30% as the load becomes larger. In a photovoltaic power system with a solar-cell module, a solar-cell module panel outputs a voltage ranging from 17V to 21V. The system as a whole outputs 170V to 350V. The output voltage Vout fluctuats in the range of 120V to 450V. Moreover, in a wind generator system, an output voltage of about 50V is generated. While the impeller vanes are rotating, the output fluctuates in the range of 30V to 50V.

Figure 2:
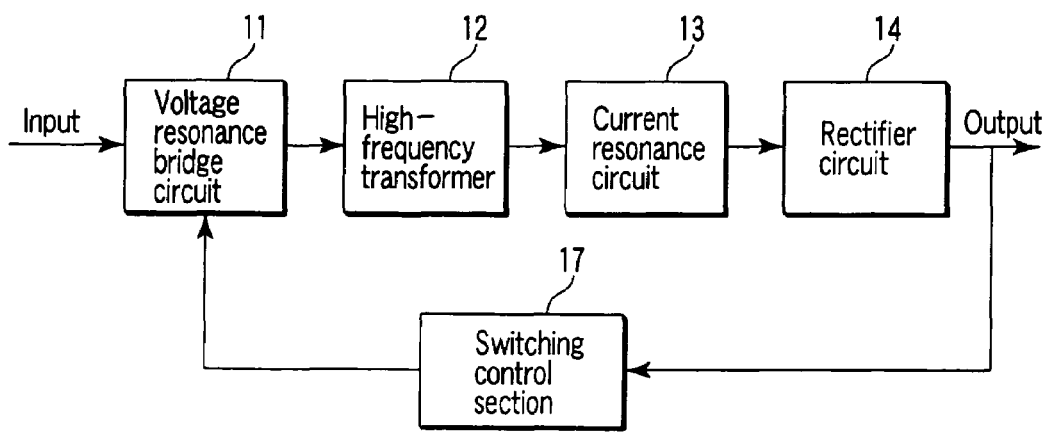
FIG. 2 is a block diagram showing a circuit configuration of a DC-DC converter according to an embodiment of the present invention.

FIG. 2 is a block diagram showing a circuit configuration of the converter section 10 related to an embodiment of the present invention.

The converter section 10, which is a high-frequency insulating DC-DC converter, includes a high-frequency transformer 12, a voltage resonance circuit 11 which is provided between a direct-current power supply 3 of FIG. 1 and the primary side of the high-frequency transformer 12 and which outputs a high-frequency voltage, a current resonance circuit 13 provided on the secondary side of the high-frequency transformer 12, and a rectifier circuit 14 that rectifies the output current from the current resonance circuit 13. The converter circuit 10 further includes a switching control section 17 which controls the voltage resonance circuit 11 according to the output voltage Vout from the rectifier circuit 14. Unlike a DC-DC converter applied to an ordinary high-voltage power supply, the DC-DC converter of FIG. 2 has the voltage resonance circuit 11 provided on the primary side and the current resonance circuit 13 provided on the secondary side that outputs a high voltage. As described later, the output of the DC-DC converter is so controlled that the DC-DC converter outputs an almost constant voltage, for example, a reference voltage of 400V.

In a DC-DC converter applied to an ordinary high-voltage power supply, a current resonance circuit and a voltage resonance circuit are provided on the primary side of the high-frequency transformer 12. However, since the DC-DC converter section 10 of FIG. 2 is applied to the power supply 3 of a relatively low voltage, providing the current resonance circuit on the primary side of the high-frequency transformer 12 as in the ordinary DC-DC converter inevitably permits current to increase as the amount of output power is increased, with the result that the current value goes too high. Therefore, in the converter section 10 of FIG. 2, the voltage resonance circuit 11 is provided on the primary side of the high-frequency transformer 12 and the current resonance circuit 13 is provided on the secondary side of the high-frequency transformer 12 which outputs a high voltage. Suppose interconnected inverters are used in Japan. In this case, the DC-DC converter section 10 is generally connected to the interconnected inverter unit of a 200-V system and a voltage of about 370V is output from the secondary side of the high-frequency transformer 12.

The voltage resonance circuit 11 provided on the primary side includes a switching element, such as an FET (field-effect transistor) or an IGB (insulated-gate bipolar transistor). A capacitor is connected between the source and drain of the switching element (or between the emitter and collector in the case of IGBT) so that the voltage resonance circuit 11 may voltage-resonate. The current resonance circuit 13 provided on the secondary side is configured so as to current-resonate through series resonance.

The operation of the circuit configured to have a switching element as described above will be explained briefly below.

In the voltage resonance circuit 11, when the output from the power supply is decreased, the operating frequency of the switching element is increased so as to make the output voltage (a high-frequency voltage) almost constant. As the operating frequency increases, the impedance of the current resonance circuit is increased. Specifically, in the current resonance circuit, the output becomes the largest at the resonance frequency and the frequency is increased as the output becomes smaller.

Figure 3A:
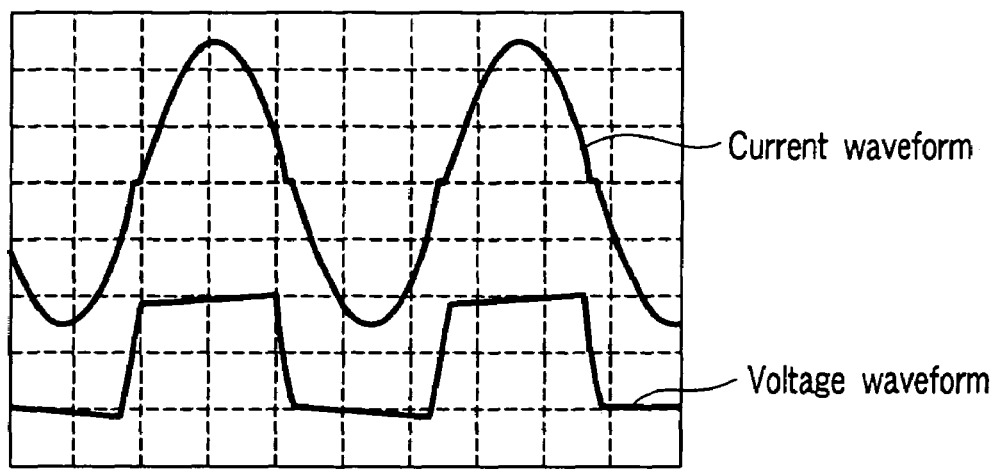
FIG. 3A is a waveform diagram schematically showing the secondary output of the DC-DC converter.
Figure 3B:
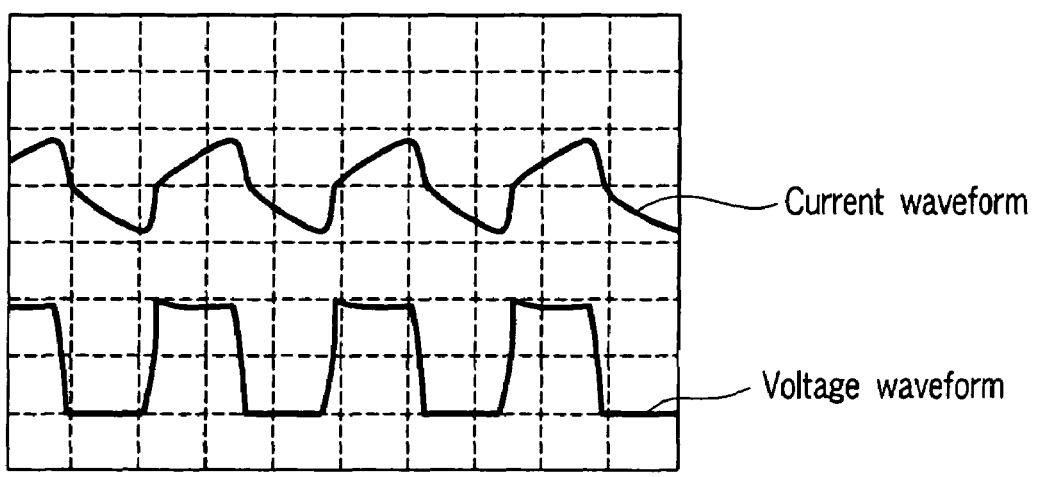
FIG. 3B is a waveform diagram schematically showing the secondary output of the DC-DC converter.

Referring to FIGS. 3A and 3B, switching loss at the voltage resonance circuit will be explained in further detail. FIG. 3A shows a current waveform and a voltage waveform on the secondary side of the high-frequency transformer in the rated output mode in which the output from the voltage resonance circuit is large. FIG. 3B shows a current waveform and a voltage waveform on the secondary side of the high-frequency transformer in the small output mode in which the output from the voltage resonance circuit is small; In the rated output mode in which the output from the power supply is sufficiently large, the switching element is operated at a specific operating frequency and the output current changes in a sine wave as shown in FIG. 3A, whereas in the small output mode in which the output from the voltage resonance circuit is decreased and lowered, the current waveform and voltage waveform on the secondary side of the high-frequency transformer are distorted as shown in FIG. 3B and their frequencies are increased.

In the DC-DC converter related to the embodiment, the operating frequency of the current resonance circuit is changed so as to control the energy conversion of the DC-DC converter, thereby phase-modulating the voltage at the voltage resonance circuit 11, which realizes zero-voltage switching (ZVS) at a high efficiency, while keeping the resonance. As described above, the embodiment of the invention makes use of the following characteristic: when the frequency is changed, the operating point of the secondary side of the current resonance circuit 13 moves; when the frequency is decreased, the power rises, and when the frequency is increased, the power drops, that is, the amount of energy transmitted changes. Therefore, a high-efficiency DC-DC converter can be realized.

The voltage resonance circuit 11 of FIG. 2 can employ three types of circuit configuration:

(1) Full bridge
(2) Half bridge
(3) Push-pull

Figure 4:
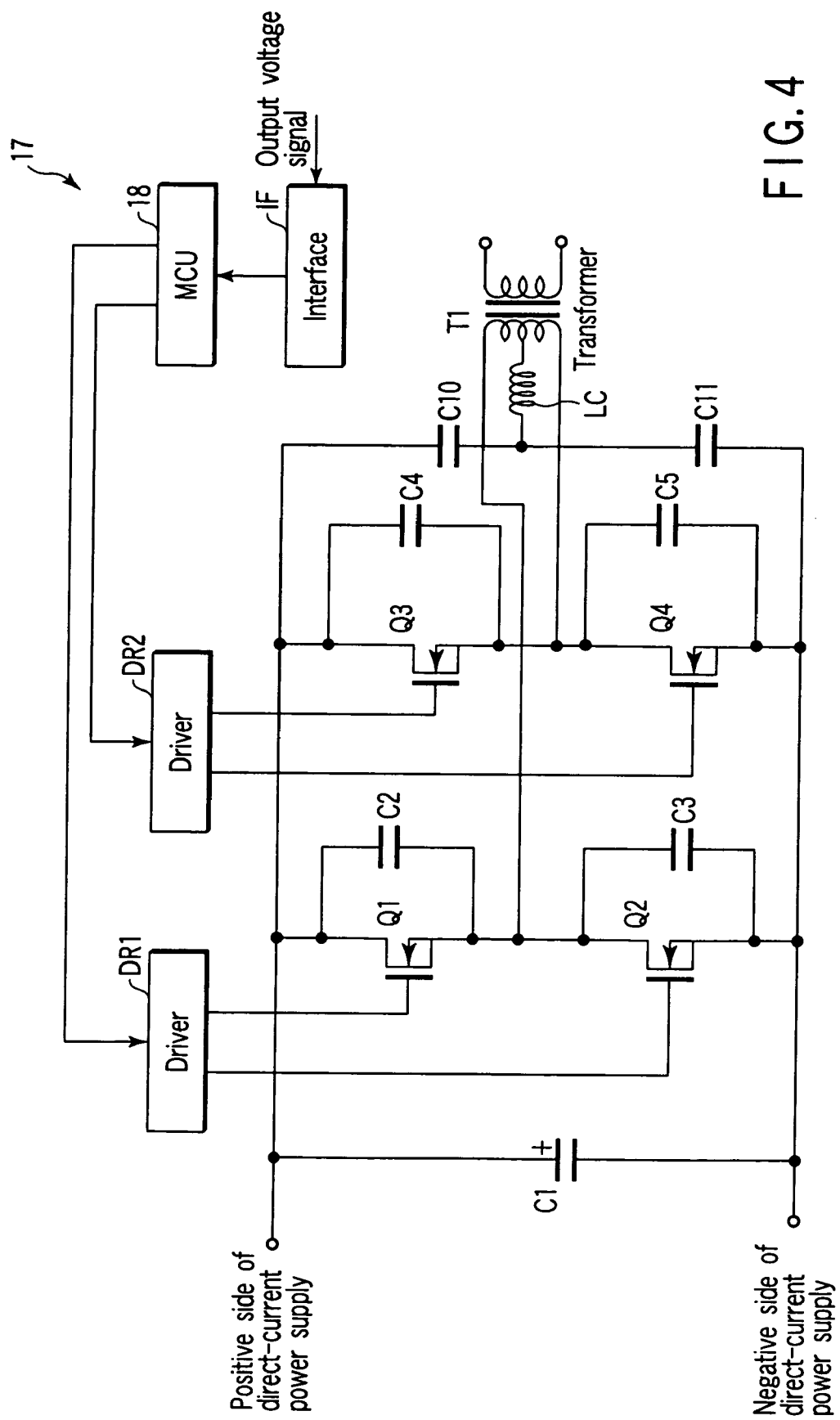
FIG. 4 is a circuit diagram showing an example of the voltage resonance circuit of FIG. 2.
Figure 5:
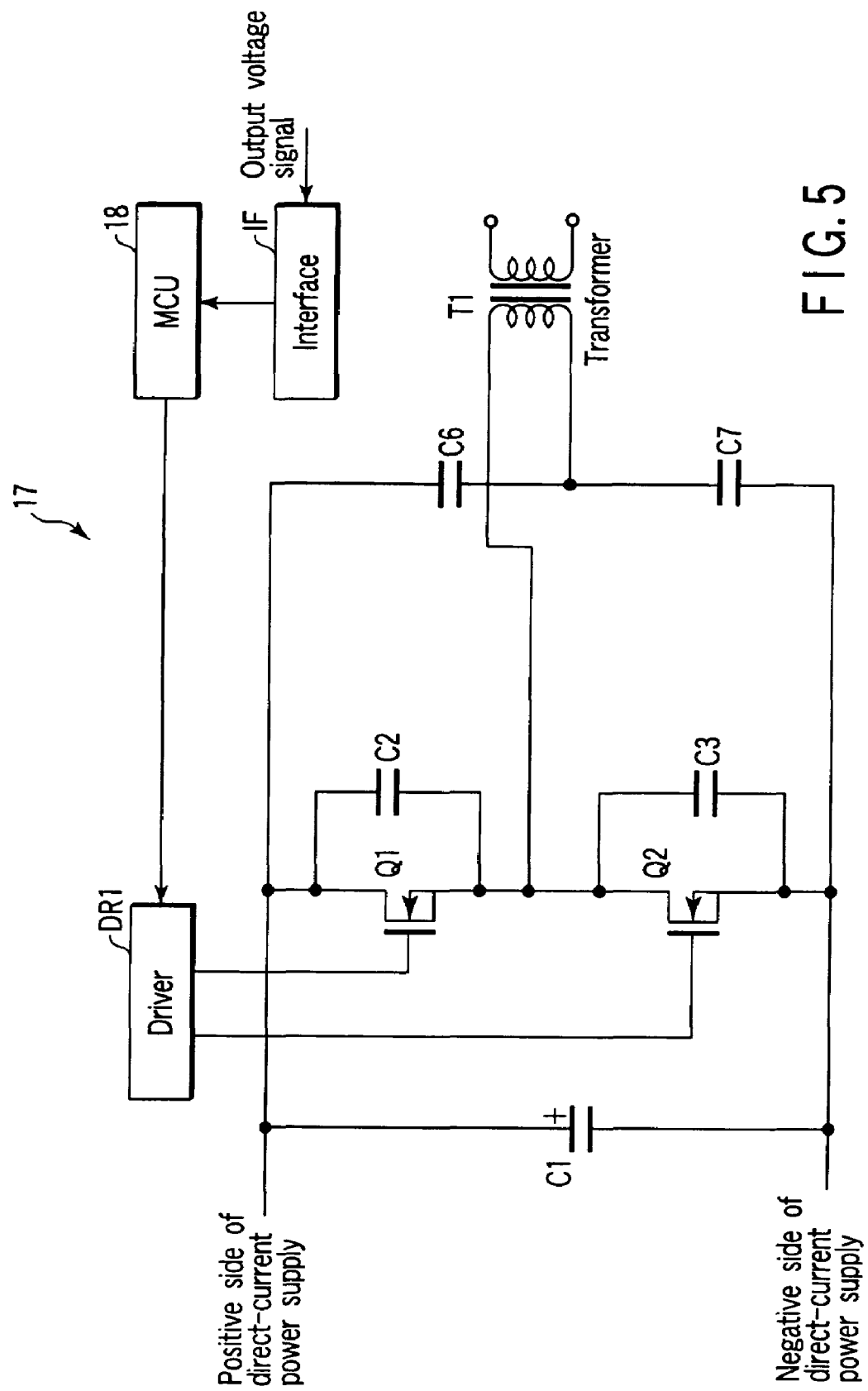
FIG. 5 is a circuit diagram showing another example of the voltage resonance circuit of FIG. 2.
Figure 6:
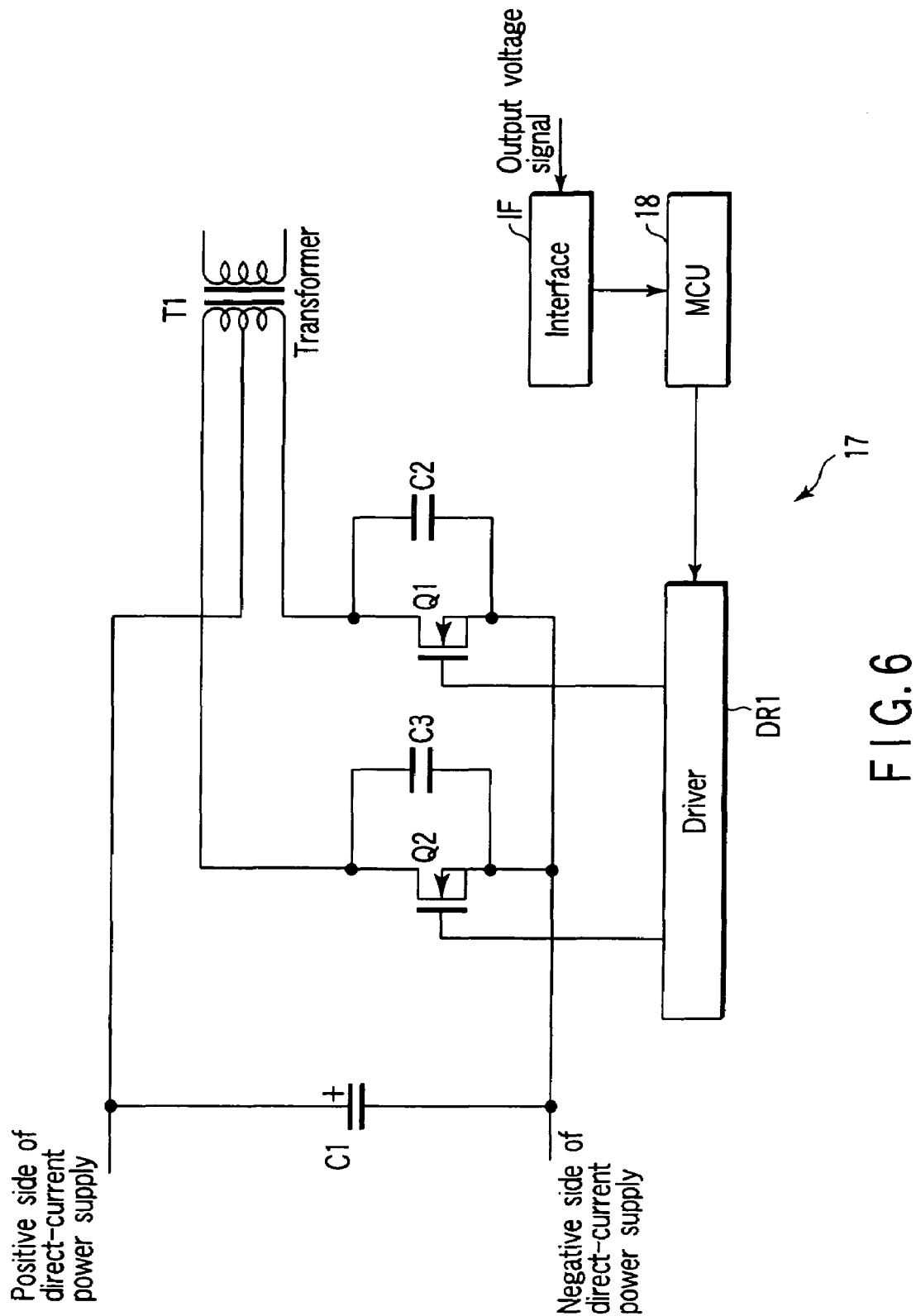
FIG. 6 is a circuit diagram showing still another example of the voltage resonance circuit of FIG. 2.

Concrete examples of these voltage resonance circuits are shown in FIGS. 4 to 6.

Figure 7:
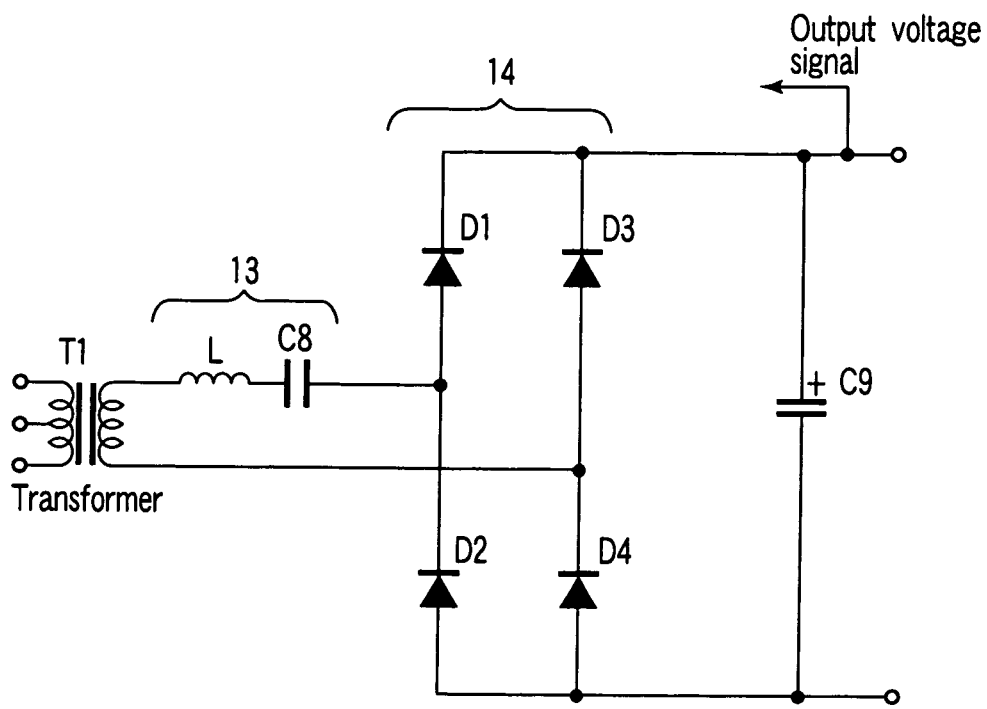
FIG. 7 is a circuit diagram showing an example of the current resonance circuit of FIG. 2.
Figure 8:
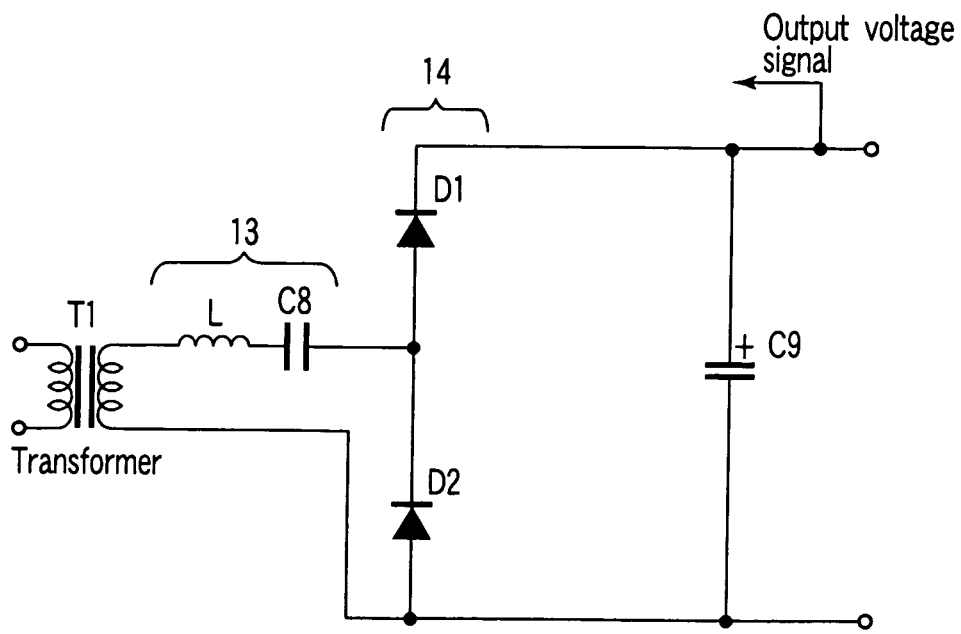
FIG. 8 is a circuit diagram showing another example of the current resonance circuit of FIG. 2.

Furthermore, the current resonance circuit 13 of FIG. 2 can employ two types of circuit configuration:

(4) Full-bridge rectifier circuit
(5) Voltage doubler rectifier circuit Concrete examples of these current resonance circuits 13 are shown in FIGS. 7 to 8.

As seen from the above description, the total of combinations of the voltage resonance circuit 11 and current resonance circuit 13 is six. The DC-DC converter circuit 10 of FIG. 2 can be realized by the six combinations.

Referring to FIGS. 4 to 6, an example of the voltage resonance circuit 11 will be explained. In FIGS. 4 to 6, an electrolytic capacitor is generally used as a storage capacitor C1. This holds true for each circuit and therefore its explanation will be omitted. A case where an FET is used as the switching element will be explained.

FIG. 4 shows a first example of the circuit where the voltage resonance circuit 11 is composed of a full-bridge circuit.

In the voltage resonance circuit of FIG. 4, a switching element Q1 and a switching element Q2 are connected in series and a switching element Q3 and a switching element Q4 are connected in series. A capacitor C2 is connected in parallel with the source-drain of the switching element Q1. A capacitor C3 is connected in parallel with the source-drain of the switching element Q2. A capacitor C4 is connected in parallel with the source-drain of the switching element Q3. A capacitor C5 is connected in parallel with the source-drain of the switching element Q4. The series circuit of the switching elements Q1, Q2 and the series circuit of the switching elements Q3, Q4 are connected in parallel with the direct-current power supply on the input side so as to configure a full-bridge circuit. Specifically, the drains of the switching elements Q1, Q3 are connected to the positive side of the power supply and the sources of the switching elements Q2, Q4 are connected to the negative side of the power supply.

The junction of the switching element Q1 and the switching element Q2 is connected to one end of the transformer T1 on the output side. The junction of the switching element Q3 and the switching element Q4 is connected to the other end of the transformer T1.

The full-bridge circuit of FIG. 4 is provided with a switching control section 17 for turning on and off the switching elements Q1 to Q4 with specific timing. The switching control section 17 is composed of drivers DR1, DR2, an MCU (micro-controller unit) 18, and an interface IF. In the switching control section 17, the output voltage Vout of the DC-DC converter circuit 10 is detected. The detected signal is supplied via the interface, for example, an isolation amplifier, to the MCU 18. The MCU 18 outputs frequency control and phase control signals to the drivers DR1, DR2. The drivers DR1, DR2 supply control signals as feedback signals to the gates of the switching elements Q1 to Q4, thereby controlling the switching elements Q1 to Q4.

In the voltage resonance circuit of FIG. 4, the series connection of the switching elements Q1, Q2, the series connection of the switching elements Q3, Q4, and the series connection of the capacitors C10, C11 are connected in parallel. One end of a choke coil LC is connected to the junction point of the capacitors C10, C11. The other end of the choke coil LC is connected to the midpoint of the primary coil of the transformer T1. In this specification, the circuit composed of the capacitors C10, C11 and the choke coil LC is referred to as a "commutation circuit."

The commutation circuit is provided to increase efficiency in a small output of several percents to 30% of the rated output. In a small output, the commutation circuit maintains voltage resonance. Specifically, in a relatively high output, such as the rated output, such a resonance circuit as is composed of the transistor Q1 and the capacitor C2 is caused to resonate. In a low output, since such a circuit cannot maintain resonance, the choke coil LC and capacitors C1, C2, C3, C4, C5 maintains resonance. Specifically, as the electric power lowers, the current flowing through the transformer decreases. However, this current is supplemented by the current from the choke coil LC, thereby maintaining resonance.

Accordingly, providing the commutation circuit between the voltage resonance circuit 11 and the transformer makes it possible to maintain resonance even in a small output and realize high conversion efficiency even in a small output.

The operation of the circuit shown in FIG. 4 will be explained later.

FIG. 5 shows a second example of the circuit where the voltage resonance circuit 11 is composed of a half-bridge circuit. In FIG. 5, the same circuit components and the same parts as those in FIG. 4 are indicated by the same reference numerals.

In the voltage resonance circuit of FIG. 5, the switching element Q1 and switching element Q2 are connected in series. A capacitor C2 is connected in parallel with the source-drain of the switching element Q1. A capacitor C3 is connected in parallel with the source-drain of the switching element Q2. The series circuit of the switching elements Q1, Q2 is connected in parallel with the series connection of the capacitors C6, C7 so as to configure a half-bridge circuit.

The junction of the switching element Q1 and the switching element Q2 is connected to one end of the transformer T1. The junction of the capacitor C6 and capacitor C7 is connected to the other end of the transformer T1.

The half-bridge circuit of FIG. 5 is provided with a driver DR1 to turn on and off the switching elements Q1, Q2 with specific timing. The output voltage Vout of the DC-DC converter circuit 110 is detected. This signal is supplied via an interface IF to the MCU 18, which then outputs a frequency control signal to the driver DR1. The driver DR1 supplies a control signal as a feedback signal to the gates of the switching elements Q1, Q2, thereby controlling the switching elements Q1, Q2.

FIG. 6 shows a third example of the circuit where the voltage resonance circuit 11 is of the push-pull type. FIG. 6 shows a push-pull voltage resonance circuit. In FIG. 6, the same circuit components and the same parts as those in FIG. 4 are indicated by the same reference numerals.

In FIG. 6, the drain of the switching element Q1 is connected to one end of the transformer T1. The drain of the switching element Q2 is connected to the other end of the transformer T1. The sources of the switching elements Q1, Q2 are connected to the negative side of the direct-current power supply. The positive side of the direct-current power supply is connected to the intermediate part between one end and the other end of the transformer T1.

The push-pull voltage resonance circuit 11 of FIG. 6 is provided with a driver DR1 to turn on and off the switching elements Q1, Q2 with specific timing. The output voltage Vout of the DC-DC converter circuit 10 is detected. This signal is supplied via an interface IF to the MCU 18, which then outputs a frequency control signal to the driver DR1. The driver DR1 supplies a control signal as a feedback signal to the gates of the switching elements Q1, Q2, thereby controlling the switching elements Q1, Q2.

Next, referring to FIGS. 7 and 8, a concrete example of the current resonance circuit 13 will be described.

FIG. 7 shows a fourth circuit composed of a combination of a full-bridge rectifier circuit 14 and the current resonance circuit 13.

The current resonance circuit 13 is so configured that an inductor L and a capacitor C8 are connected in series. In the current resonance circuit 13, an inductor L is connected to one end of the transformer T1 and a capacitor C8 is connected to the bridge rectifier circuit 14 on the output side. In the bridge rectifier circuit 14, the output side of the capacitor C8 is connected to the junction of a diode D1 and a diode D2 connected in series. The other end of the transformer T1 is connected to the junction of a diode D3 and a diode D4. The diodes D1, D2 are connected in series. The diodes D3, D4 are connected in series. The series connection of the diodes D1, D2 and the series connection of the diodes D3, D4 are connected in parallel so as to configure a bridge circuit. On the output side of the bridge circuit, a smoothing capacitor C9 is connected in series with the bridge circuit. An electrolytic capacitor is generally used as the smoothing capacitor C9. An interface IF is connected to the smoothing capacitor C9. The output voltage signal Vout is output to the interface IF.

Figure 18:
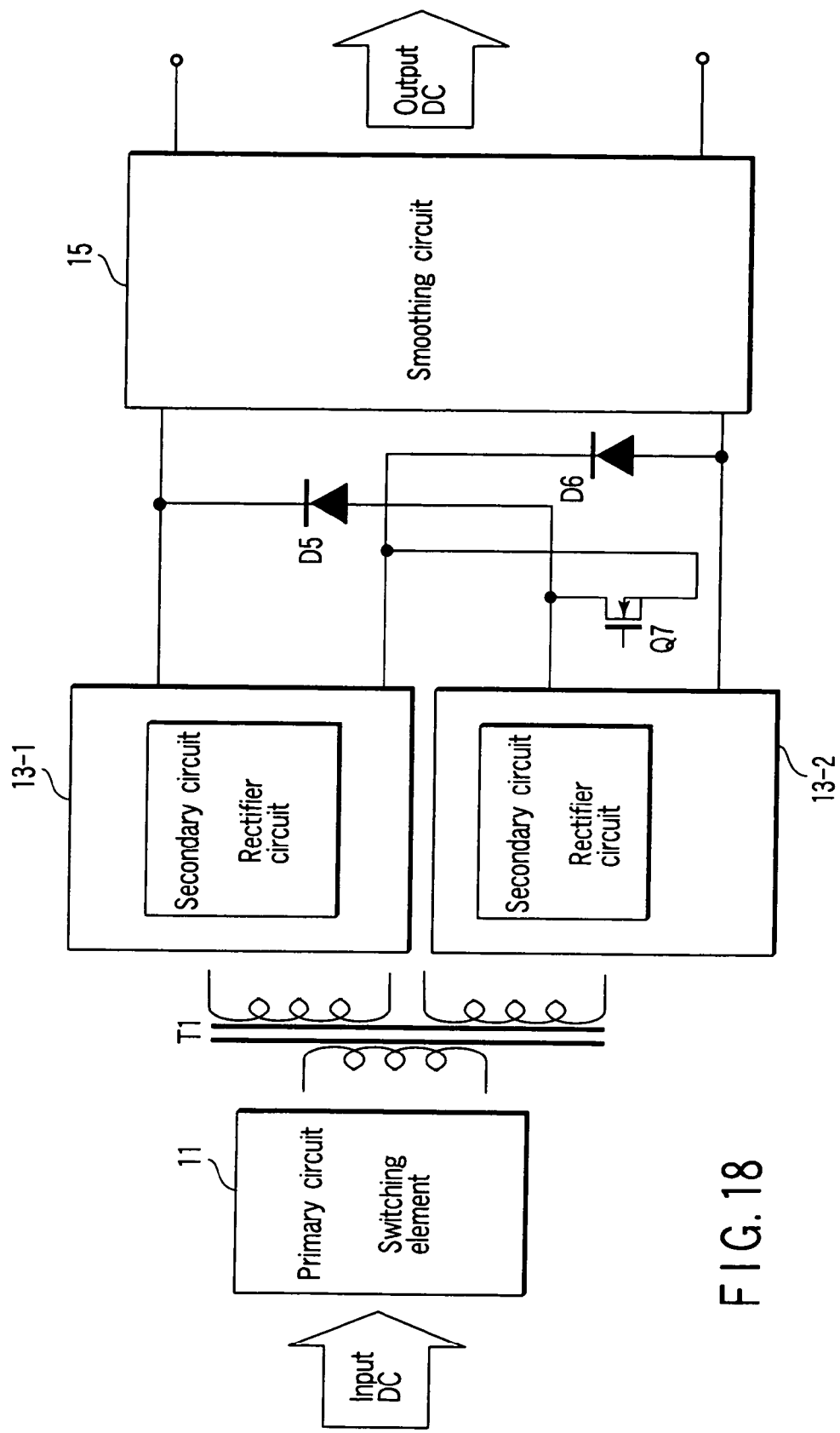
FIG. 18 is a block diagram showing a modification of the circuit of FIG. 15.

FIG. 8 shows a fifth circuit composed of a combination of a step-up bridge circuit 14 and the current resonance circuit 13. In FIG. 18, the same circuit components and the same parts as those in FIG. 7 are indicated by the same reference numerals.

As in the circuit shown in FIG. 7, in the current resonance circuit 13, an inductor L and a capacitor C8 are connected in series. The inductor L is connected to one end of the transformer T1 and the capacitor C8 is connected to the output side of the inductor L. In the step-up bridge circuit 14, diode D1 and diode D2 are connected in series. The output side of the capacitor C8 is connected to the junction of the diodes D1, D2 connected in series. The other end of the transformer T1 is connected to the anode of the diode D2 and to one end of the capacitor C9. The anode of he diode D2 is connected to one end of the capacitor C9 and the cathode of the diode D1 is connected to the other end of the capacitor C9. The smoothing capacitor C9 is connected in parallel with the series circuit of the diodes D1, D2. The interface If of the switching control section 17 is connected to the smoothing capacitor C9. The output voltage signal Vout is output to the interface IF.

Figure 9:
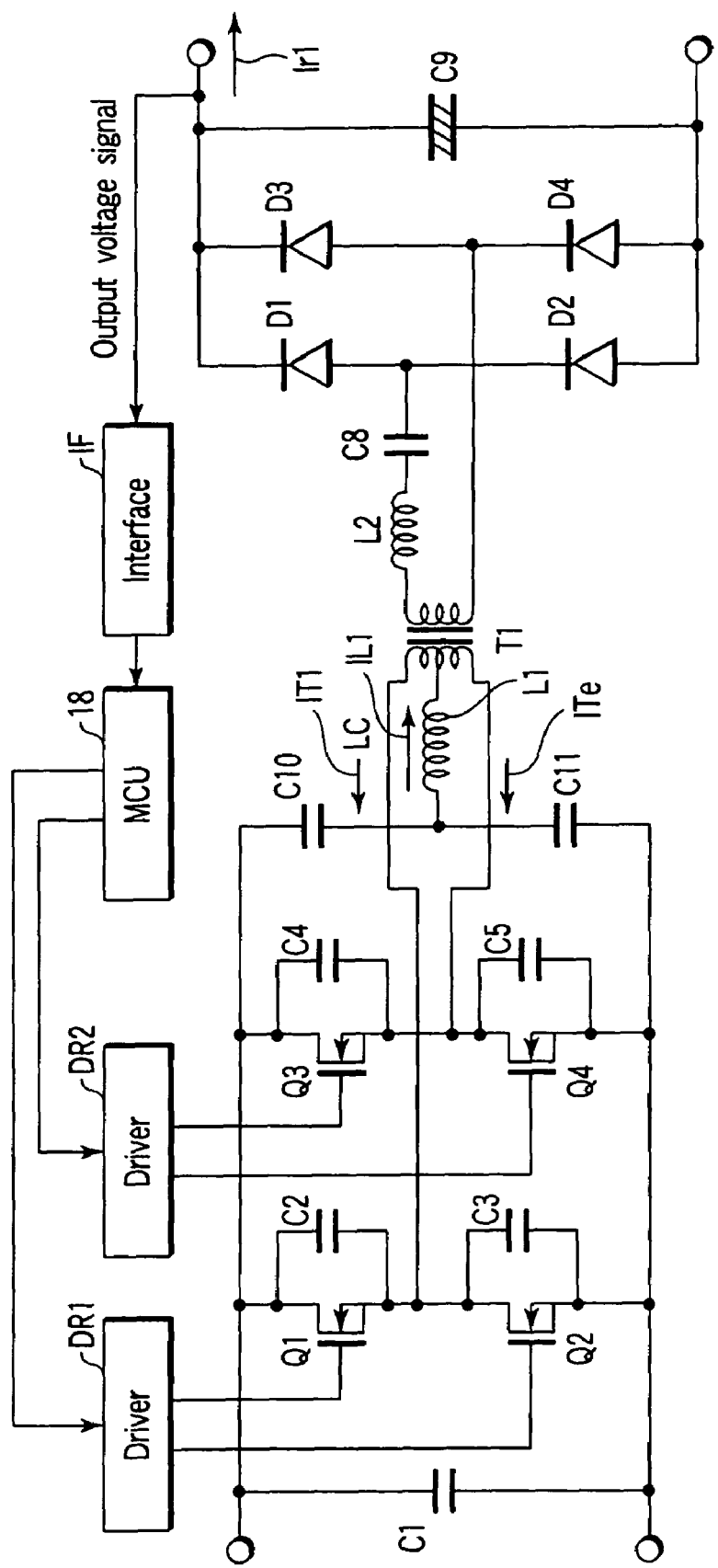
FIG. 9 is a circuit diagram showing a circuit related to a combination of FIG. 4 and FIG. 7.

Referring to FIGS. 9 and 10, the operation of the DC-DC converter in the rated output mode, small output mode, and no-load mode will be explained. FIG. 9 shows a circuit configuration of a DC-DC converter composed of a combination of the full-bridge voltage resonance circuit 11 of FIG. 4 and the full-bridge rectifier circuit 14 of FIG. 7. In FIG. 9, the same parts as those in FIGS. 4 and 7 are indicted by the same reference numerals and an explanation of them will be omitted. FIG. 10 shows a functional block to help explain the function of the MCU 18 in the switching control section 17.

As shown in FIG. 10, the MCU 18 compares the output voltage signal Vout from the rectifier circuit 14 with a reference voltage Vref. When no load is connected to the rectifier circuit 14, the DC-DC converter is operated in the no-load mode. When a load is connected to the rectifier circuit 14 and an output voltage in the range of the rated voltage corresponding to the reference voltage Vref is detected, the DC-DC converter 11 is operated in the rated output mode. Moreover, although a load is connected to the rectifier circuit 14, when an output voltage signal Vout a little lower than the rated voltage corresponding to the reference voltage Vref is detected, the DC-DC converter is operated in the small output mode.

In the no-load mode, the set reference voltage Vref is compared with the output voltage signal Vout at a comparator 34. Since the output voltage signal Vout is sufficiently larger or almost equal to the reference voltage Vref in the no-load mode, a frequency f0 higher than the resonance frequency of the voltage resonance circuit of FIG. 9 is selected from a frequency table 30. A phase which causes the first and third FETs Q1, Q3 to be operated in the same phase and the second and fourth FETs Q2, Q4 to be operated in the same phase is selected from a phase table 32. A pulse generator 35 supplies a first to a fourth gate pulse to the corresponding FETs Q1 to Q4 in the selected phase at the selected frequency. In the no-load mode, the DC-DC converter is basically operated in such a manner that the primary side of the high-frequency transformer T1 is connected alternately to the positive side and negative side of the direct-current power supply.

Since the output voltage signal Vout compared at the comparator 34 is lower than the reference voltage Vref in the rated mode, a frequency f0 almost equal to the resonance frequency f0 of the voltage resonance circuit of FIG. 9 is selected from the frequency table 30. A phase which causes the first and fourth FETs Q1, Q4 to be operated in the same phase and the second and third FETs Q2, Q3 to be operated in the same phase is selected from the phase table 32. Here, timing which gives a phase difference of 180 degrees between the first and third FETs Q1, Q3 and between the second and fourth FETs Q2, Q4 is selected from the phase table 32. The pulse generator 35 supplies a first to a fourth gate pulse to the corresponding FETs Q1 to Q4 in the selected phase at the selected frequency. In the rated mode, the DC-DC converter is basically operated in such a manner that both primary ends of the high-frequency transformer T1 are switched periodically between the positive side and negative side of the direct-current voltage supply.

Since the output voltage signal Vout is higher than the reference voltage Vref compared at the comparator 34 in the small output mode, a frequency fb higher than the resonance frequency f0 of the voltage resonance circuit of FIG. 9 is selected from the frequency table 30. The first and third FETs Q1, Q4 have a phase difference in the range of 0 to 180 degrees determined according to the output. For the second and fourth FETs Q2, Q4, a certain phase is selected from the phase table 32. The pulse generator 35 supplies a first to a fourth gate pulse to the corresponding FETs Q1 to Q4 in the selected phase at the selected frequency. In the small output mode, the DC-DC converter is basically operated in such a manner that both primary ends of the high-frequency transformer T1 are switched periodically between the positive side and negative side of the direct-current voltage supply and, in the meantime, the converter receives energy from the commutation circuit.

The output of the DC-DC converter is suppressed by selecting a higher frequency from the frequency table 30 and shifting the impedance of the current resonance circuit from the resonance point. Therefore, the frequency selected from the frequency table together with the reference voltage may be selected from outside the MCU 18.

First, referring to FIGS. 11(A) to 11(H), explanation will be given about the operation of the DC-DC converter in the rated output mode in which the direct-current power supply 3 generates the output voltage (reference voltage Vout) at the rating.

When the DC-DC converter of FIG. 9 is connected to the direct-current power supply 3 via a switch (not shown), the charging of the capacitor C1 is started. Similarly, the charging of the series circuit of the capacitors C2, C3 and the series circuit of the capacitors C4, C5 connected in parallel with the capacitor C1 is also started.

Figure 11:
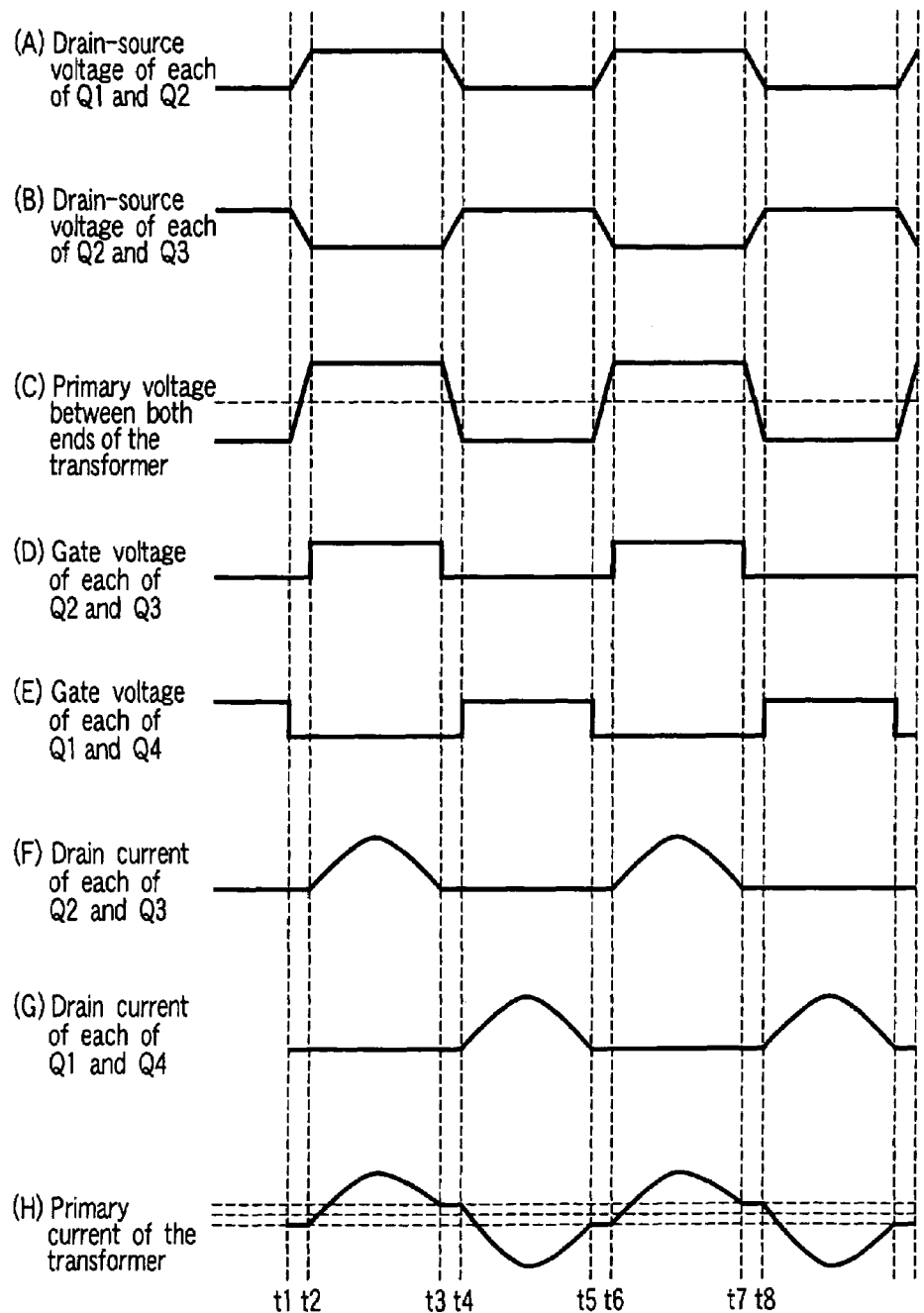
FIG. 11 shows waveforms, at (A) to (H), at various sections in the rated output mode of the DC-DC converter of FIG. 9.

At a certain time t1, a control pulse signal is supplied to the driver circuits DR1, DR2, thereby operating the driver circuits DR1, DR2. At time t1, a first and a fourth gate signal shown in FIG. 11(E) are switched from the high level to the low level in synchronization with the control pulse signal. Therefore, as shown in FIG. 11(A), the FETs Q1, Q4 to which the first and fourth gate pulse have been supplied are kept off.

After time t1, the exciting current of the transformer causes the source-drain voltages of the FETs Q2, Q3 to start to drop as shown in FIG. 11(B) and the source-drain voltages of the FETs Q1, Q4 to start to rise as shown in FIG. 11(A). Moreover, as shown in FIG. 11(C), the primary voltage of the high-frequency transformer T1 also starts to rise as shown in FIG. 11(C).

When time t2 elapsed a specific time Δt from time t1 is reached, a second and a third gate signal shown in FIG. 11(D) are supplied to the gates of the FETs Q2, Q3, thereby conducting between their source and drain as shown in FIG. 11(B) and lowering the source-drain voltages of the FETs Q2, Q3 to zero, which keeps the FETs Q2, Q3 in the on state. The source-drain voltages of the FETs Q1, Q4 kept off reach the input voltage as shown in FIG. 11(A). Therefore, as shown in FIG. 11(C), the primary voltage of the high-frequency transformer T1 has reached a specific voltage, supplying current to the FETs Q2, Q3, which causes their drain currents to increase as shown in FIG. 11(F). This current is supplied as an exciting current to the primary side of the high-frequency transformer T1, with the result that an induced voltage appears on the secondary side.

Since the impedance of the current resonance circuit connected to the secondary side of the high-frequency transformer T1 is high immediately after the FETs Q2, Q3 go on, the drain currents in the FETs Q2, Q3 are increased from zero gradually. From time t2 to time t3, a sinusoidal half-wave drain current is generated according to the resonance frequency of the current resonance circuit connected to the secondary side of the high-frequency transformer T1.

At time t3, when the second and third gate signals supplied to the FETs Q2, Q3 are turned off, the FETs Q2, Q3 are turned off, causing the drain currents in the Q2 and Q3 to decrease to zero as shown in FIG. 11(F). Therefore, the supply of energy to the secondary side of the high-frequency transformer T1 is stopped. Moreover, the source-drain voltages of the FETs Q2, Q3 turned off as shown in FIG. 11(B) are raised gradually and the source-drain voltages of the FETs Q2, Q4 turned off as shown in FIG. 11(A) are raised gradually. As the source-drain voltages of the FETs Q2, Q3 rise, the source-drain voltages of the FTEs Q1, Q4 fall. Accordingly, the primary voltage of the high-frequency transformer T1 is also lowered.

When time t4 elapsed a specific time At from time t3 is reached, a first and a fourth gate signal shown in FIG. 11(E) are supplied to the gates of the FETs Q2, Q3, thereby conducting between the source and drain as shown in FIG. 11(A) and lowering the source-drain voltages of the FETs Q1, Q4 to zero. From time t4 to time t5, the FETs Q1, Q4 are kept in the on state. The source-drain voltages of the FETs Q2, Q4 kept off reach the input voltage as shown in FIG. 11(B). Therefore, as shown in FIG. 11(C), the primary voltage of the high-frequency transformer T1 has reached a specific negative voltage, supplying current to the FETs Q2, Q3 conducting through the capacitors C1, C2, C3, which causes their drain currents to increase as shown in FIG. 11(G). This current is supplied as an exciting current to the primary side of the high-frequency transformer T1, with the result that an induced voltage appears on the secondary side.

From time t3 to time t4, the capacitors C1, C5 connected in parallel with the FETs Q1, Q4 are discharged gradually and therefore the source-drain voltages of the FETs Q1, Q4 are lowered gradually. Thereafter, at time t4, the FETs Q1, Q4 are turned on. At this time, changes in the source-drain voltages of the FETs Q1, Q4 are very small at the moment switching is done. Therefore, practical zero voltage resonance switching (ZVS) is realized.

From time t5 on, the same operations as those from time t1 to time t4 are repeated, which produces an induced voltage on the secondary side of the high-frequency transformer T1. Here, time t5, time t6, time t7, and time t8 correspond to time t1, time t2, time, t3, and time t4, respectively. Refer to the explanation of the corresponding time.

Here, from time t5 to time t6, the capacitors C2, C5 connected in parallel with the FETs Q1, Q4 are charged gradually and therefore the source-drain voltages of the FETs Q1, Q4 are raised gradually. Thereafter, at time t6, the FETs Q2, Q3 are turned on. At this time, changes in the source-drain voltages of the FETs Q2, Q3 are very small at the moment switching is done. Therefore, practical zero voltage resonance switching (ZVS) is realized.

Figure 12:
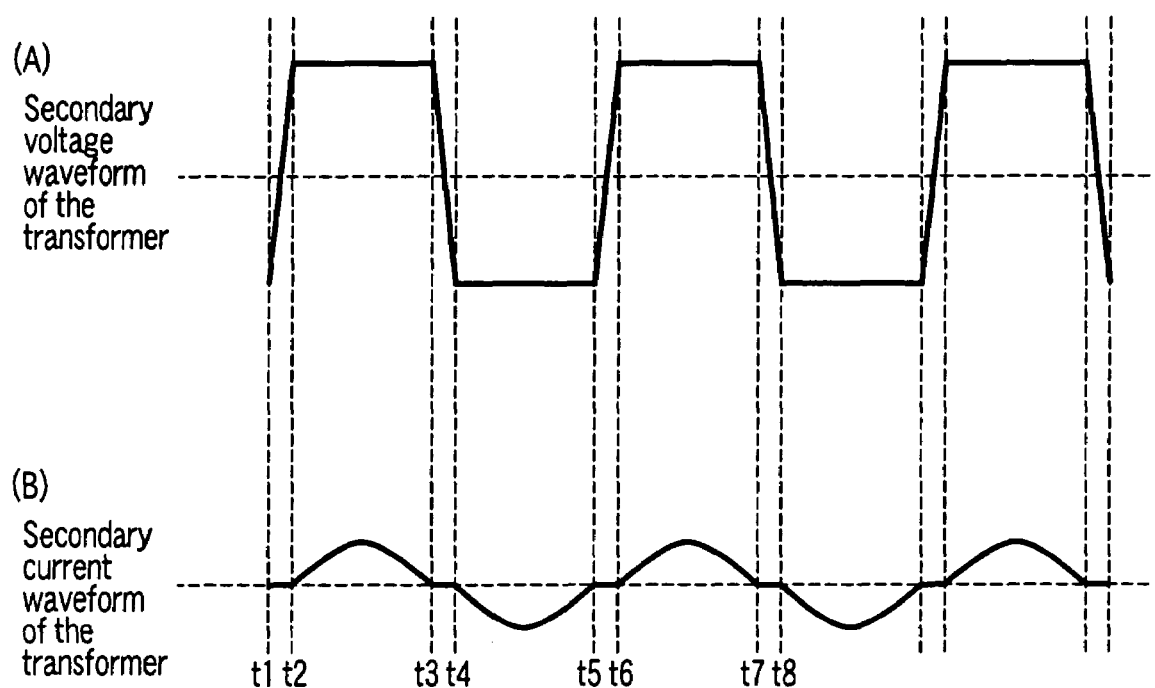
FIG. 12 shows, at (A) and (B), voltage and current waveforms on the secondary side of the high-frequency transformer of FIG. 9 in the rated output mode.

As described above, the voltage resonance circuit is operated, with the result that a voltage waveform and a current waveform as shown in FIGS. 12(A) and 11(B) are output at the secondary side of the high-frequency transformer T1. Specifically, a trapezoidal wave voltage appears at the secondary side of the high-frequency transformer T1 as shown in FIG. 12(A) according to the voltage waveform on the primary side of the high-frequency transformer T1 of FIG. 11(C). In addition, a trapezoidal wave voltage appears at the secondary side of the high-frequency transformer T1 as shown in FIG. 12(B) according to the current waveform on the primary side of the high-frequency transformer T1 of FIG. 11(H).

In the DC-DC converter, the first and fourth gate signals applied to the gates of the FETs Q1, Q4 are generated in the same phase and the second and third gate signals applied to the gates of the FETs Q2, Q3 are generated in the same phase. Thus, current is not supplied to the commutation circuit composed of the choke coil LC and capacitors C10, C11 and therefore the commutation circuit is not practically operated.

Since those skilled in the art can readily understand the operations of the half-bridge voltage resonance circuit 11 of FIG. 5 and the push-pull voltage resonance circuit 11 of FIG. 6, referring to the explanation of the full-bridge voltage resonance circuit 11 of FIG. 4, an explanation of their operations will be omitted.

The operation of the DC-DC converter has been explained on the assumption that the related power supply 3 has been outputting the rated voltage. However, an ordinary power supply, for example, a fuel cell, is often operated at less than the rated output, a so-called small output (about 30% of the rated output). In this case, resonance cannot be maintained (that is, soft switching becomes incomplete), with the result that the efficiency decreases extremely. Therefore, it is necessary to raise efficiency in a small output operation at less than 50% of the rated output. Accordingly, the control signal is adjusted so that efficiency may be maintained even in the small output mode. Specifically, in the small output mode, when the secondary voltage has reached a voltage higher than the rated voltage (higher than the reference voltage, such as 400V or less), the MCU 18 supplies a control signal in the small output mode to the driver so as to cause the driver to generate a first to a fourth gate signal higher in frequency than in the rated mode as described below. Moreover, as explained below, the MCU 18 operates the driver circuits DR1, DR2 in such a manner that a phase difference is given to the first and fourth gate signals and to the second and third gate signals.

In a case where the power supply 3 goes into the small output mode (at about 30% of the rating), the operation of the DC-DC converter of FIG. 9 composed of the full-bridge circuit explained in FIG. 4 to maintain its output will be explained, referring to FIGS. 13(A) to 13(M). As shown in FIG. 9, it is assumed that, when current IL1 flowing through the choke coil LC is a positive current, current flows from the capacitor C7 to the intermediate tap of the transformer T1 and that, when IL1 is a negative current, current flows from the intermediate tap of the transformer T1 to the capacitor C7. In the current IT1 flowing in the primary side of the high-frequency transformer T1, the direction in which current flows from the primary side of the high-frequency transformer T1 to the junction point of the transistors Q1, Q2 is determined to be positive and the direction in which current flows from the junction point of the transistors Q1, Q2 to the primary side of the high-frequency transformer T1 is determined to be negative. Similarly, in the current IT2 flowing in the primary side of the high-frequency transformer T1, the direction in which current flows from the primary side of the high-frequency transformer T1 to the junction point of the transistors Q3, Q4 is determined to be positive and the direction in which current flows from the junction point of the transistors Q1, Q2 to the primary side of the high-frequency transformer T1 is determined to be negative.

When the DC-DC converter of FIG. 9 is connected to the direct-current power supply 3 via a switch (not shown), the charging of the capacitor C1 is started. Similarly, the charging of the series circuit of the capacitors C2, C3, the series circuit of the capacitors C4, C5, and the series circuit of the capacitors C6, C7 connected in parallel with the capacitor C1 is also started.

Figure 13:
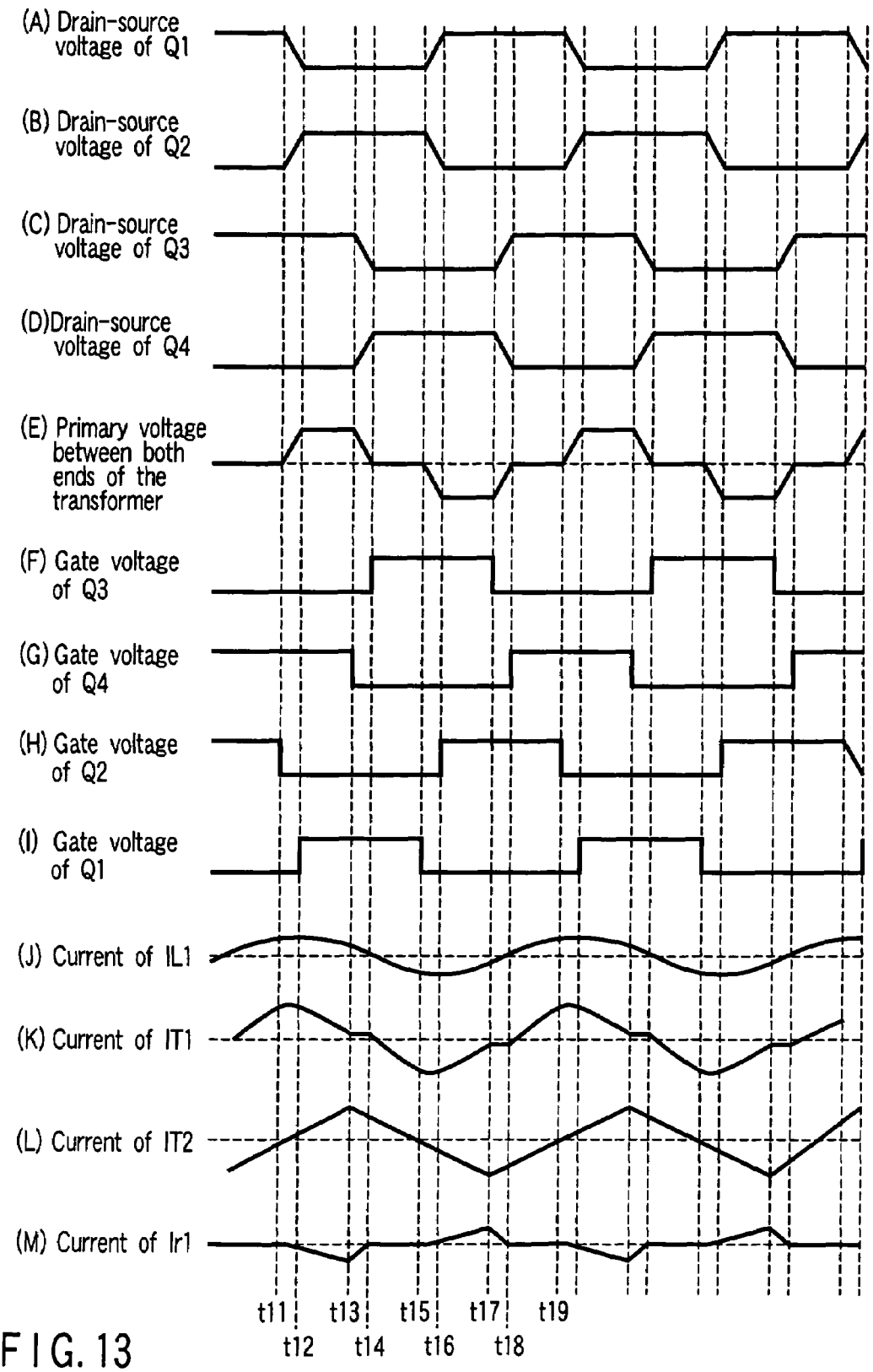
FIG. 13 shows, at (A) to (M), waveforms at various sections in the small output mode of the DC-DC converter of FIG. 9.

Before time t11, when the control pulse signal is supplied to the driver circuits DR1, DR2, causing the drivers FETDR1, DR2 to operate, which turn on the transistors Q2, Q4, the primary side of the high-frequency transformer T1 is connected to the negative side as shown in FIG. 13(E) and goes into the ground potential. Therefore, if the capacitor C7 is in the charged state, current IL1 will flow from the capacitor C7 via the choke coil LC to the primary side of the high-frequency transformer T1 as shown in FIG. 13(J). The current IL1 is branched on the primary side of the high-frequency transformer T1 and flows via the FETs Q2, Q4 to the negative side of the direct-current power supply. As a result, as shown in FIGS. 13(K) and 13(L), currents IT1, IT2 will flow in the primary side of the high-frequency transformer. Here, since the primary side of the high-frequency transformer T1 remains at the ground potential, the current resonance circuit 13 on the secondary side of the high-frequency transformer T1 does not output current Ir.

At a certain time t11, the second gate signal from the driver circuit DR1 is switched from the high level to the low level as shown in FIG. 13(H), thereby turning off the on FET Q2. At time t12 elapsed Δtk from time t11, the first gate signal is switched from the low level to the high level as shown in FIG. 13(I). Therefore, as shown in FIG. 13(B), the source-drain voltage of the FET Q2 in the off state is raised.

At time t11, the third gate signal is kept at the low level as shown in FIG. 13(F). Therefore, as shown in FIG. 13(C), the FETQ3 to which a third gate pulse has been supplied is kept in the off state. At time t11, too, the fourth gate signal is maintained at the high level as shown in FIG. 13(G). Thus, as shown in FIG. 13(D), only the FETQ4 to which a fourth gate pulse has been supplied is kept in the on state.

After time t11, the gate cut-off voltage applied to the FETQ2 brings the source-drain of the FET Q2 into the off state. Thus, the source-drain voltage of the FETQ1 starts to fall as shown in FIG. 13(A) and the source-drain voltage of the FET Q2 switched off starts to rise. After time t11, too, since the transistors Q3, Q4 are kept in the off and on states, respectively, the drain-source voltages of the transistors Q3, Q4 are maintained at the high level and the low level, respectively. As a result of FETQ2 being turned off, the primary potential of the transformer LC rises from the negative side gradually as shown in FIG. 13(E), current IT1 in the primary side of the high-frequency transformer T1 reaches a peak and current IT2 starts to increase as shown in FIG. 13(K) and FIG. 12(L). Moreover, as shown in FIG. 13(J), choke current IL1 continues being supplied from the capacitor C7 via a choke coil LC11.

When time t12 is reached, the first gate signal shown in FIG. 13(I) is supplied to the gate of FET Q1, causing the source-drain of FET Q1 to conduct as shown in FIG. 13(A) and lowering the source-drain voltage of FET Q1 to zero, which keeps the FET Q1 in the on state. The source-drain voltage of FET Q2 kept off reaches the input voltage as shown in FIG. 13(B). In addition, the primary voltage of the high-frequency transformer T1 reaches a specific voltage via the series circuit of the FETs Q1, Q4 in the on state, causing current IT1 on the primary side of the high-frequency transformer T1 to be decreased gradually and current IT2 to be increased. From time t12 on, too, current continues being supplied from the capacitor C11 via the choke coil LC as shown in FIG. 13(J). Therefore, the current resonance circuit 13 on the secondary side of the high-frequency transformer T1 starts to output current Ir as shown in FIG. 13(M).

At time t13, when the fourth gate signal turns off the FET Q4 as shown in FIG. 13(G), the primary voltage of the high-frequency transformer T1 starts to fall and the supply of current from the capacitor C7 via the choke coil LC decreases. As a result of the decrease, current IT1 on the primary side of the high-frequency transformer T1 substantially stops and current IT2 begins to decrease from the peak. Therefore, at the current resonance circuit 13 on the secondary side of the high-frequency transformer T1, current Ir which has reached the peak on the negative side starts to decrease as shown in FIG. 13(M).

At time t14 elapsed a specific time Δt from time t13, the source-drain voltage of the FET Q3 goes to about zero and almost at the same time, the third gate signal causes the FET Q3 to conduct as shown in FIG. 13(F). Since the FETs Q1, Q3 are on and the FETs Q2, Q4 are off, the primary side of the high-frequency transformer T1 is maintained at a positive voltage as shown in FIG. 13(E) and the direction in which current flows through the choke coil LC is changed in such a manner that current flows in the choke coil LC in the direction in which the capacitor C7 is charged as shown in FIG. 13(J). Therefore, the primary side of the high-frequency transformer Ti goes to the ground voltage as shown in FIG. 13(E) and the current resonance circuit 13 stops the supply of current Ir as shown in FIG. 13(M). As shown in FIGS. 13(K) and 13(L), current IT1 flowing in the primary side of the high-frequency transformer T1 is also increased in the negative direction and current IT2 is also decreased.

At time t15, when the first gate pulse turns off the FET Q1, the drain-source voltage of the FET Q1 is raised and the drain-source voltage of the FET Q2 is lowered. Here, since the FET Q3 is in the on state, the primary voltage of the high-frequency transformer T1 starts to fall as shown in FIG. 13(E).

At time t16, when the second gate pulse turns on the FET Q2, the FET Q2 is caused to conduct between its source and drain as shown in FIG. 13(B), lowering the source-drain voltage of the FET Q2 to zero, which keeps the FET Q2 in the on state. In addition, the source-drain voltage of the FET Q1 kept off is raised until the source-drain voltage reaches the input voltage as shown in FIG. 13(A). Therefore, the primary voltage of the high-frequency transformer T1 reaches a specific negative voltage via the series circuit of the FETs Q2, Q3 in the on state as shown in FIG. 13(E), which decreases the negative current IT1 on the primary side of the high-frequency transformer T1 gradually. The current IT2 is increased on the negative side. From time t16 on, too, current continues being supplied via the choke coil LC to the capacitor C7 as shown in FIG. 13(J), thereby charging the capacitor C7. Thus, the current resonance circuit 13 on the secondary side of the high-frequency transformer T1 starts to output a positive current Ir as shown in FIG. 13(M).

At time t17, when the third gate signal turns off the FET Q3 as shown in FIG. 13(G), the primary voltage of the high-frequency transformer T1 starts to rise. In addition, the supply of current IL1 via the choke coil LC to charge the capacitor C7 decreases. As a result of the decrease in the supply, the current IT1 on the primary side of the high-frequency transformer T1 practically stops and the negative current IT2 starts to decrease from the peak. Therefore, in the current resonance circuit 13 on the secondary side of the high-frequency transformer T1, the current Ir which has reached its positive peak starts to decrease as shown in FIG. 13(M).

At time t18 elapsed a specific time Δt from time t17, the source-drain voltage of the FET Q4 becomes almost zero and almost at the same time, the fourth gate signal causes the FET Q4 to conduct as shown in FIG. 13(G). Since the FETs Q2, Q4 are on and the FETs Q1, Q3 are off, the primary side of the high-frequency transformer T1 is kept at 0V as shown in FIG. 13(E) and current from the capacitor C7 to the choke coil LC is started as shown in FIG. 13(J). Therefore, the primary side of the high-frequency transformer T1 goes to the ground voltage as shown in FIG. 13(E) and the current resonance circuit 13 stops the supply of current Ir as shown in FIG. 13(M). Moreover, as shown in FIGS. 13(K) and 13(L), current IT1 flowing in the primary side of the high-frequency transformer T1 is increased toward the positive side and the current IT2 is also increased toward to the positive side.

When time t19 is reached, the operations explained referring to time t11 to time t18 are repeated and the current resonance circuit 13 supplies current Ir as shown in FIG. 13(M).

Since those skilled in the art can readily understand the operations of the half-bridge voltage resonance circuit 11 of FIG. 5 and the push-pull voltage resonance circuit 11 of FIG. 6, referring to the explanation of the full-bridge voltage resonance circuit 11 of FIG. 4, an explanation of their operations will be omitted.

Figure 14:
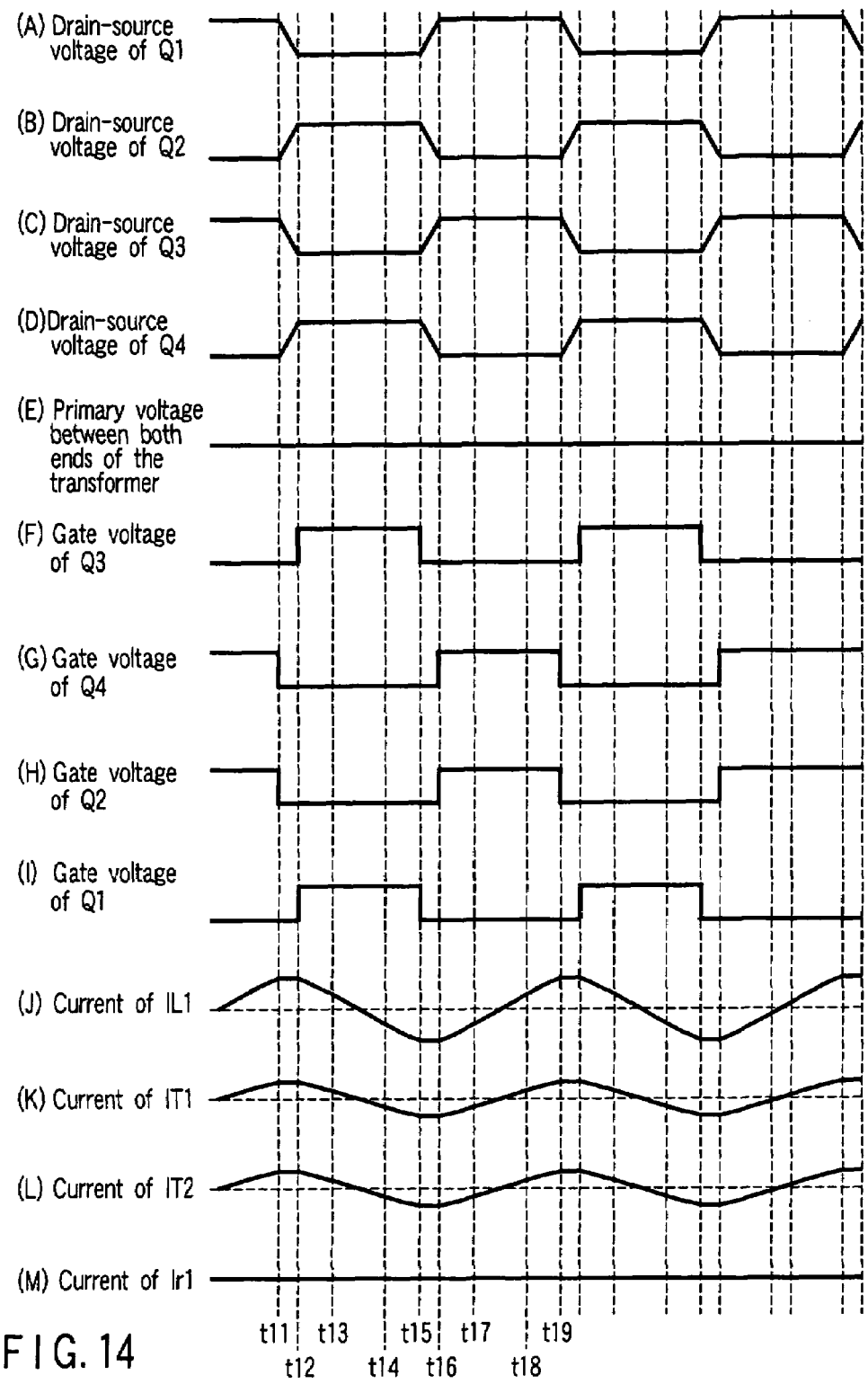
FIG. 14 shows, at (A) to (M), waveforms at various sections in the no-load mode of the DC-DC converter of FIG. 9.

FIGS. 14(A) to 13(M) show the waveforms at various sections shown in FIG. 9 when no load is connected to the rectifier circuit 14. Even when no load is connected to the rectifier circuit 14, the voltage resonance circuit 11 maintains voltage resonance, whereas the current resonance circuit 14 is not operated, because the high-frequency transformer T1 does not supply current to the current resonance circuit 14.

With no load, the second and fourth gate signals are generated in the same phase as shown in FIGS. 14(F) to 13(I), the first and third gate signals are generated in the same phase, and the FETs Q2, Q4 and the transistors Q1, Q3 are turned on and off in synchronization as shown in FIGS. 14A to 13(D). Hereinafter, the operation of the circuit with no load shown in FIG. 9 will be explained.

At time t11, the second and fourth gate signals are switched from the high level to the low level in synchronization with the control pulse signal as shown in FIGS. 14(G) and 14(H). Therefore, as shown in FIG. 14(A), the FETs Q2, Q4 to which the second and fourth gate pulses have been supplied are kept off. In addition, at time t12, the first and third gate signals are generated as shown in FIGS. 14(F) and 14(I).

Before time t11, since the FET Q2, Q4 are kept on and the FETs Q1, Q3 are kept off, the conducting FETs Q2, Q4 connect the primary side of the high-frequency transformer T1 to the negative side of the direct-current power supply and keeps the primary side at the same potential, with the result that no potential difference appears on the primary side and the primary voltage is kept at zero. Accordingly, the secondary side of the high-frequency transformer T1 does not output current Ir1 as shown in FIG. 14(M), keeping the primary voltage at zero. Moreover, the charged capacitor C11 supplies current IL1 via the choke coil L1 to the intermediate tap of the high-frequency transformer T1 as shown in FIG. 14(J) and the primary side supplied the currents IT1, IT2 to the FETs Q2, Q4 as shown in FIGS. 14(K) and 13(L).

At time t11, the FETs Q2, Q4 are turned off, which stops not only the increase of the current IL1 as shown in FIG. 14(J) but also the increase of the currents IT1, IT2 flowing from the primary side of the high-frequency transformer T1 into the FETs Q2, Q4 as shown in FIGS. 14(K) and 13(L). At time t11, too, since the primary side of the high-frequency transformer T1 is kept at the same potential, no potential difference appears on its primary side and the primary voltage is kept at zero. The secondary side of the high-frequency transformer T1 does not output current Ir1 as shown in FIG. 14(M) and is kept at zero.

After time t11, current from the choke coil L1 charges the capacitors C2, C4 and C3, C5. As a result, the source-drain voltages of the FETs Q1, Q3 start to fall as shown in FIGS. 14(A) and 14(C) and the source-drain voltages of the FETs Q2, Q4 start to rise as shown in FIGS. 14(B) and 14(D).

When time t12 elapsed a specific time Δt from time t11 is reached, the first and third gate signals of the high level are supplied to the gates of the FETs Q1, Q3 as shown in FIGS. 14(F) and 13(I), causing each of the FETs Q1, Q3 to conduct between its source and drain, which decreases the source-drain voltage of the FETs Q1, Q3 to zero and keeps the FETs Q1, Q3 in the on state. Moreover, the source-drain voltages of the FETs Q2, Q4 kept off reach the input voltage as shown in FIGS. 14(B) and 14(D). Since the primary side of the high-frequency transformer T1 is kept at the same potential by the conducting FETs Q1, Q3, no potential difference appears on its primary side and the primary voltage is kept at zero. Thus, the secondary side of the high-frequency transformer T1 does not output current Ir1 as shown in FIG. 14(M) and is kept at zero.

From time t12 to time t15, current IL1 decreases gradually as shown in FIG. 14(J) and current from the positive side of the power supply starts to charge the capacitor C1. That is, current IL1 changes from positive to negative and starts to charge the capacitor C11. As the current IL1 changes, the currents IT1, IT2 are also changed from positive to negative as shown in FIGS. 14(K) and 13(L).

At time t15, the first and third gate signals supplied to the FETs Q1, Q3 are turned off, which turns off the FETs Q1, Q3 and the source-drain voltages of the FETs Q1, Q3 are raised gradually.

At time t16 elapsed a specific time Δt from time t15, the second and fourth gate signals shown in FIGS. 14(G) and 14(H) are supplied to the gates of the FETs Q2, Q4, causing the FETs Q2, Q4 to conduct as shown in FIGS. 14(B) and 14(D), which lowers the source-drain voltages of the FETs Q2, Q4 to zero. The primary side of the high-frequency transformer T1 is connected to the negative side of the power supply via the FETs Q2, Q4. Since both ends of the primary side are kept at the same potential, no potential difference appears on the primary side, keeping the primary voltage at zero. Similarly, the secondary side of the high-frequency transformer T1 does not output current Ir1 as shown in FIG. 14(M) and is kept at zero.

Thereafter, at time 18 corresponding to time t11, the FETs Q2, Q4 are turned off and the FETs Q1, Q3 are turned on and the operations from time t11 to time t18 are repeated.

In the interconnected inverter, the configuration to increase conversion efficiency when the converter section 10 has a single DC-DC converter circuit has been explained. However, the converter section 10 may have two DC-DC converter circuits or units as shown in FIG. 15. As described below, in such a converter section 10, to improve efficiency, the connection of two DC-DC converter units is switched so as to output a voltage at high efficiency.

In each of the converter units 10-1, 10-2 of FIG. 15, its primary circuit 11 is composed of any one of the circuits of FIGS. 4 to 6 and the transformer T corresponds to any one of the transformers T1 of FIGS. 4 to 9. The secondary circuit 13 corresponds to the circuit shown in either FIG. 7 or FIG. 8. Therefore, each of the converter units 10-1, 10-2 outputs the voltage between both ends of the capacitor C9 in the secondary circuit 13 as a voltage signal. Since the converter units 10-1, 10-2 have been explained, referring to the drawings, an explanation of them will be omitted.

The primary circuit 11 of each of the converter units 10-1, 10-2 shown in FIG. 15 may not be provided with the commutation circuit LC composed of the capacitors C10, C11 and choke coil L1 shown in FIGS. 4 and 9. Specifically, in the circuit shown in FIG. 15, each of the first converter unit 10-1 and second converter unit 10-2 may not be provided with the commutation circuit composed of the choke coil L1 and capacitors C10, C11 for supplementing electric energy in a small output and the efficiency of the converter section 10 can be improved. As shown in FIG. 15, a diode D5 is connected between the high-potential side of the smoothing capacitor C9 corresponding to the high-voltage side of the first converter unit 10-1 and the high-potential side of the smoothing capacitor C9 corresponding to the high-voltage side of the second converter unit 10-2. A diode D6 is connected between the low-potential side of the smoothing capacitor C9 corresponding to the low-voltage side of the first converter unit 10-1 and the low-potential side of the smoothing capacitor C9 corresponding to the low-voltage side of the second converter unit 10-2. The anodes of the diodes D5, D6 are connected to the second converter units 10-2 and the cathodes of the diodes D5, D6 are connected to the first converter unit 10-1. A transistor Q7 is provided between the low-voltage side of the first converter unit 10-1 and the high-voltage side of the second converter nit 10-2. The transistor Q7 is driven in such a manner that it is subjected to pulse-width modulation (PWM) by the driver 17. This decreases the voltage difference in switching, reducing a switching loss. In the circuit of FIG. 15, the output of the smoothing circuit 15 is fed back to a PWM generator 16. According to the feedback, the PWM generator 16 generates a PWM signal, which drives the transistor Q7. The driver 17 includes a photo-coupler. A transistor QT is electrically isolated from the output side of the smoothing circuit 15.

Figure 16:
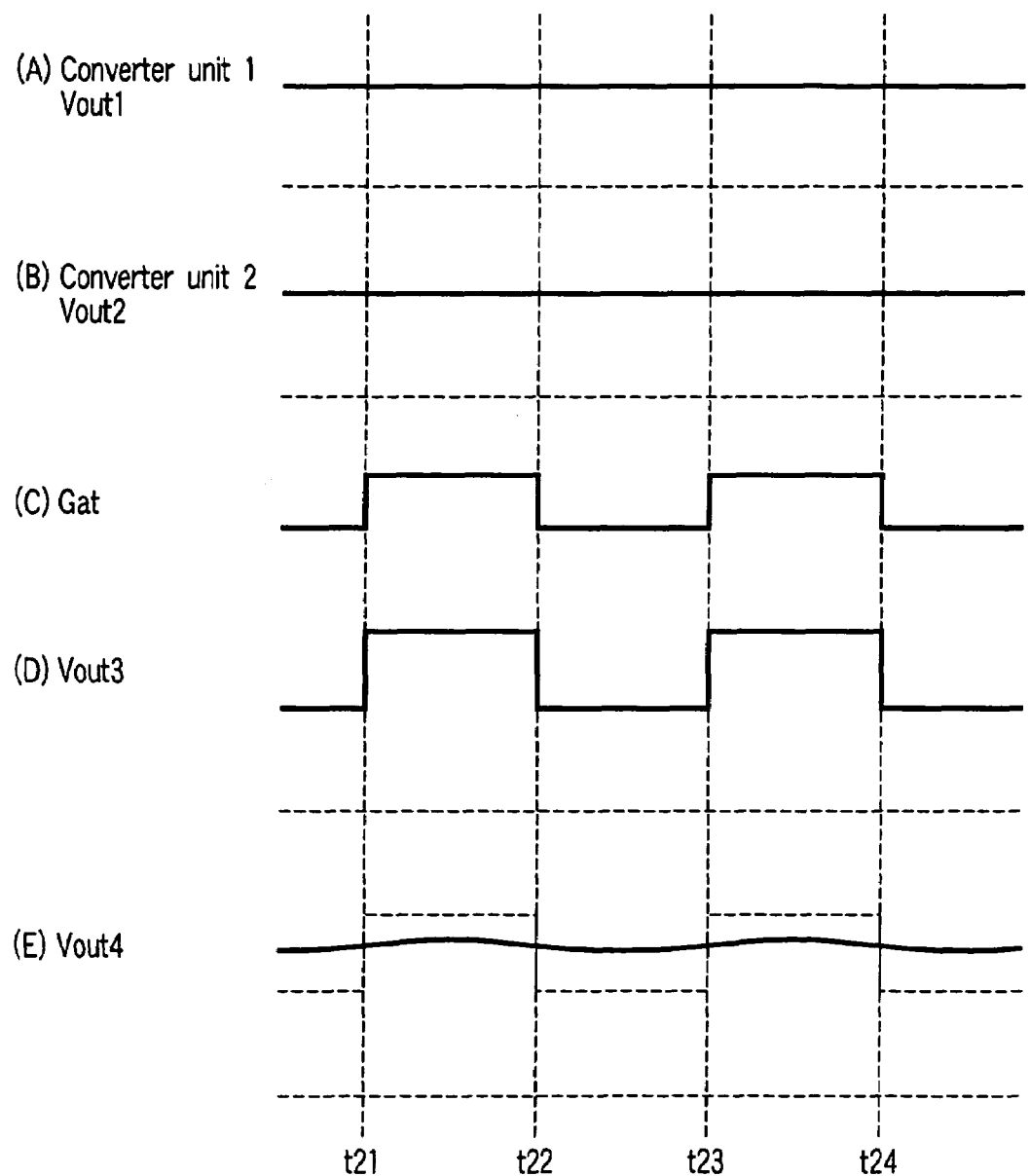
FIG. 16 shows, at (A) to (E), waveforms at various sections of the circuit of FIG. 15.

In the circuit of FIG. 15, the first converter unit 10-1 and second converter unit 10-2 output constant output voltages Vout1, Vout2 as shown in FIGS. 16(A) and 16(B). At time t21, the PWM signal generator 16 generates a PWM signal and the driver 17 turns on the transistor Q7 as shown in FIG. 16(C), connecting the diodes D5, D6 in series, which causes the low-voltage side of the first converter unit 10-1 and the high-voltage side of the second converter unit 10-2 to be connected to the junction point of the diodes D5, D6. Therefore, as shown in FIG. 16(D), such a voltage Vout3 as is obtained by connecting the power supply Vout1 and power supply Vout2 in series is output from the series circuit of the diodes D5, D6. The voltage Vout3 is input to the smoothing circuit 15. At time t22, the PWM signal is turned off, causing the secondary sides of the high-frequency transformers of the first converter unit 10-1 and second converter unit 10-2 to be connected in parallel with the smoothing circuit 15, with the result that the secondary sides of the high-frequency transformers of the first converter unit 10-1 and second converter unit 10-2 supply the voltage Vout1 or Vout2 to the smoothing circuit. Therefore, the input voltage of the smoothing circuit 15 is lowered as shown in FIG. 16(D). Similarly, at time t23, the PWN signal from the PWM signal generator 16 is turned on and the transistor Q7 is turned on as shown in FIG. 16(C), connecting the diodes D5, D6 in series, which causes the low-voltage side of the first converter unit 10-1 and the high-voltage side of the second converter unit 10-2 to be connected to the junction point of the diodes D5, D6. Therefore, as shown in FIG. 16(D), such a voltage Vout3 as is obtained by connecting the power supply Vout1 and power supply Vout2 in series is output from the series circuit of the diodes D5, D6. The voltage Vout3 is input to the smoothing circuit 15. At time t24, the PWM signal is turned off, causing the secondary sides of the high-frequency transformers of the first converter unit 10-1 and second converter unit 10-2 to be connected in parallel with the smoothing circuit 15, with the result that the secondary sides of the high-frequency transformers of the first converter unit 10-1 and second converter unit 10-2 supply the voltage Vout1 or Vout2. According to the pulse width of the PWM signal, the smoothing circuit 15 outputs an output voltage Vout4 obtained by smoothing the input voltage Vout3 as shown in FIG. 16(E). Here, as the pulse width of the PWM signal becomes larger, the output voltage Vout4 from the smoothing circuit 15 becomes higher. As the pulse width of the PWM signal becomes smaller, the output voltage Vout4 from the smoothing circuit 15 becomes lower. Thus, the output voltage of the smoothing circuit 15 is detected by the PWM signal generator 16, causing a suitable pulse width to be selected, which enables the output of the smoothing circuit 15 to be constant.

When the transistor Q7 performs a PWM operation as described above, the first converter unit 10-1 and the second converter unit 10-2 alternate between a series connection and a parallel connection. At this time, when a circuit is composed of the two units, the output Vout is as follows:

$$Vout = Vout1 \times PWM\ ratio + Vout2$$

The output control range is:

$$Vout = Vout1 \times 2$$

Figure 17:
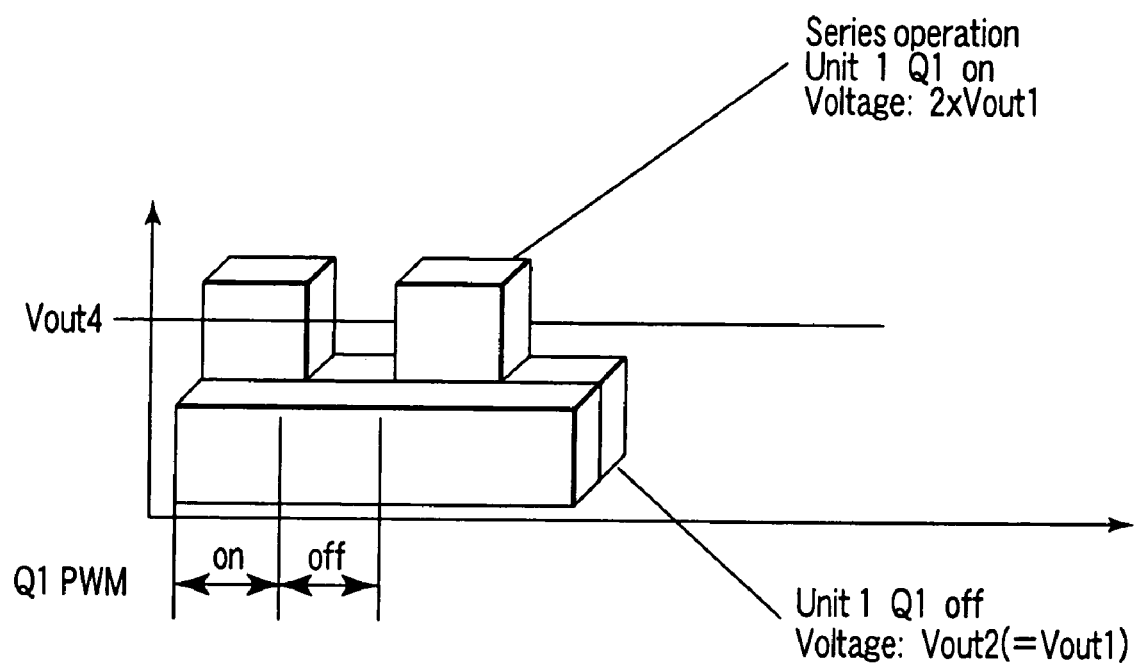
FIG. 17 is a graph showing a change in the output voltage Vout at the circuit of FIG. 15.

That is, as shown in FIG. 17, the output voltage Vout4 according to the on-off operation of the transistor Q7 is output.

In the circuit of the converter section 10, two or more secondary circuits may be provided for a single primary circuit as shown in FIG. 18. That is, the present invention may be applied to a circuit where a plurality of secondary windings are wound in a single transformer T1 as shown in FIG. 18. Specifically, a transformer T1 has a single primary side and a plurality of secondary sides, for example, two secondary sides. The voltage resonance circuits shown in FIGS. 4 to 6 are connected to the primary side of the transformer T1 and the first and second rectifier circuits 13-1, 13-2 configured as shown in FIG. 7 or 8 are connected to each of the two secondary sides. The diode D5 is connected between the high-potential side of the smoothing capacitor C9 of the first rectifier circuit 13-1 and the high-potential side of the smoothing capacitor C9 of the second rectifier circuit 13-2. The diode D6 is connected between the low-potential side of the smoothing capacitor C9 of the first rectifier circuit 13-1 and the low-potential side of the smoothing capacitor C9 of the second rectifier circuit 13-2. As in FIG. 15, the transistor Q7 subjected to pulse-width modulation (PWM) by the driver 17 is connected between the diodes D5 and D6. Although in FIG. 18, the driver 17 and the PWM signal generator are not shown, they are operated in the same manner as in FIGS. 16(A) to 16(E).

Figure 19:
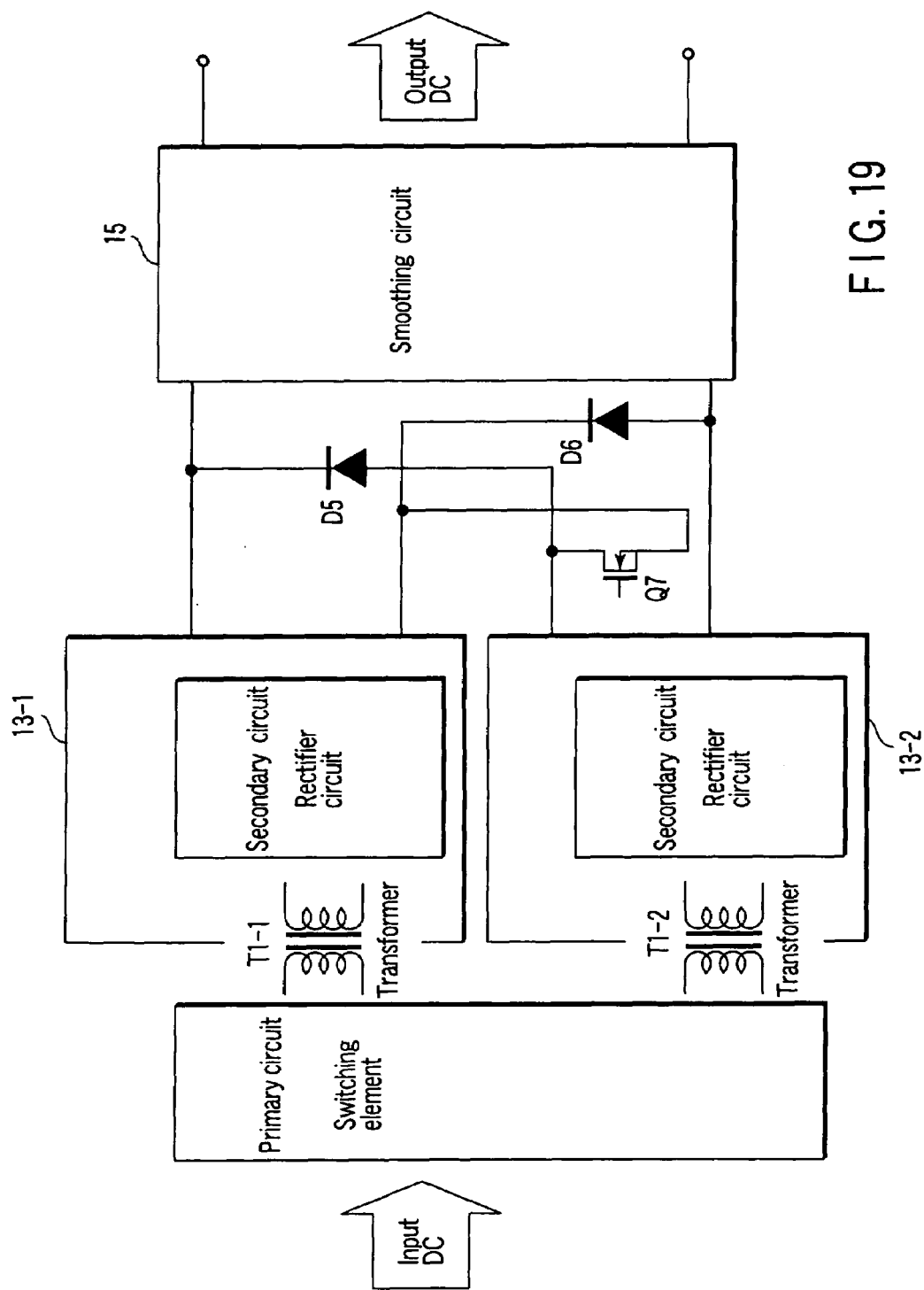
FIG. 19 is a block diagram showing a modification of the circuit of FIG. 15.

Furthermore, as shown in FIG. 19, a plurality of transformers T1-1, T1-2 may be provided in a single primary-side circuit. In the circuit of FIG. 19, the first and second rectifier circuits 13-1, 13-2 configured as shown in FIG. 7 or 8 are connected to each of a plurality of transformers T1-1, T1-2. The diode D5 is connected between the high-potential side of the smoothing capacitor C9 of the first rectifier circuit 13-1 and the high-potential side of the smoothing capacitor C9 of the second rectifier circuit 13-2. The diode D6 is connected between the low-potential side of the smoothing capacitor C9 of the first rectifier circuit 13-1 and the low-potential side of the smoothing capacitor C9 of the second rectifier circuit 13-2. As in FIG. 15, the transistor Q7 subjected to pulse-width modulation (PWM) by the driver 17 is connected between the diodes D5 and D6. Although in FIG. 18, the driver 17 and the PWM signal generator are not shown, they are operated in the same manner as in FIGS. 16(A) to 16(E).

In the primary-side circuit 11 shown in FIGS. 18 and 19, the commutation circuit LC composed of the capacitors C10, C11 and choke coil L1 shown in FIGS. 4 and 9 may not be provided. If the circuit related to the embodiment has two or more secondary outputs, it may be applied to a circuit which does not use a voltage-current resonance DC-DC converter.

In the aforementioned DC-DC converter, embodiments described below are desirable. The embodiments below may be applied independently or combined suitably.

(1) The voltage resonance circuit is of either the bridge type or the push-pull type.

(2) In item (1), the bridge voltage resonance circuit has a switching element and a capacitor connected in parallel so as to configure a bridge.

(3) In item (2), the bridge voltage resonance circuit includes a first to a fourth switching elements and a first to a fourth capacitors connected in parallel with the first to fourth switching elements respectively. The first and second switching elements connected in series and the third and fourth switching elements connected in series are connected in parallel so as to configure a bridge.

In item (2) and item (3), the capacitors connected in parallel with the switching elements may be replaced with the internal capacitance of the switching elements.

(4) The current resonance circuit includes a coil and a capacitor connected in series. The coil is connected to a first end of the transformer and the capacitor is connected to a rectifier circuit.

(5) The rectifier circuit is either a full-bridge rectifier circuit or a voltage doubler rectifier circuit.

(6) A commutation circuit for keeping resonance in a low-power input is provided between the voltage resonance circuit and the transformer.

(7) The commutation circuit, which is connected in parallel with the bridge circuit, includes two capacitors connected in series and a coil connected to both the junction point of the capacitors and the primary winding of the transformer.

The interconnected inverter according to the embodiment is characterized by comprising the DC-DC converters and the inverter which converts the outputs of the DC-DC converters into alternating-current power. In the interconnected inverter, when the number of the DC-DC converters is more than one, or when the number of the outputs from the DC-DC converters is more than one, it is desirable that a pulse-width modulation circuit which performs pulse-width modulation according to the output from the DC-DC converter should be provided between the rectifier circuit and the smoothing circuit.

An interconnected inverter according to another embodiment of the present invention is characterized by comprising at least one DC-DC converter provided on the primary side of the transformer, a DC-DC converter which includes at least two rectifier circuits provided on the secondary side of the transformer and a smoothing circuit for smoothing the outputs from the at least two rectifier circuits, and an inverter which converts the output from the DC-DC converter into alternating-current power and by providing a pulse-width modulation circuit which performs pulse-width modulation on the basis of the output from the DC-DC converter.

This invention is not limited to the above embodiments and may be practiced of embodied in still other ways without departing from the spirit or character thereof. In addition, inventions at various stages are included in the above embodiments and various inventions may be extracted by combining suitably a plurality of component elements disclosed in the embodiments.

For example, even if some components may be removed from all of the component elements disclosed in each of the embodiments, the subject described in the field "Subject to Be Achieved by the Invention" can be achieved and the effect described in the advantage of the invention is obtained. In this case, the configuration without the component elements can be extracted as an invention.

As described above, it is possible to provide a DC-DC converter which has a high conversion efficiency not only in the rated output but also in a small output.

What is claimed is:

1. A DC-DC converter comprising:
 a first voltage resonance circuit including first switching elements which are so connected as to be alternately switched, to which direct-current power is input from a low-voltage direct-current power supply the first voltage resonance circuit converting the direct-current power to an alternative-current power and outputting the alternative-current power;
 a first driver circuit which alternately and selectively turns on and turns off the first switching elements at a zero crossing timing to maintain the first voltage resonance circuit in a resonance mode, wherein substantially no conductive current is supplied to the first switching element and substantially no voltage is applied to the first switching element at the zero cross timing;
 a first insulating high-frequency transformer which has a primary side and a secondary side, the output voltage being applied to the primary side from the first voltage resonance circuit;
 a first current resonance circuit which is connected to the secondary side of the first transformer;
 a first rectifier circuit which rectifies the output current output from the first current resonance circuit;
 a first smoothing circuit which smoothes the output voltage from the first rectifier circuit to output a first output voltage;
 a second voltage resonance circuit including second switching elements which are so connected as to be alternately switched, to which the direct-current power is input from the low-voltage direct-current power supply, the second voltage resonance circuit converting the direct-current power to an alternative-current power and outputting the alternative-current power
 a second driver circuit which alternately and selectively turns on and turns off the second switching elements at the zero cross timing to maintain the second voltage resonance circuit in a resonance mode, wherein substantially no conductive current is supplied to the first switching element and substantially no voltage is applied to the first switching elements at the zero cross timing;
 a second insulating high-frequency transformer which has a primary side and a secondary side, the output voltage being applied to the primary side from the secondary voltage resonance circuit;
 a second current resonance circuit which is connected to the secondary side of the second transformer;
 a second rectifier circuit which rectifies the output current output from the second current resonance circuit;
 a second smoothing circuit which smoothes the output voltage from the second rectifier circuit to output a second output voltage;
 a pulse-width modulation circuit which pulse-width modulates the first and second output voltages from the first and second smoothing circuits, and comprises a first diode connected between the high potential sides of the first and second output voltages, a second diode connected to the low potential sides of the first and second output voltages, and a third switching element connected between the first and second diodes;
 a third smoothing circuit which smoothes the output voltage from the pulse-width modulation circuit to output a third output voltage; and
 a pulse generator which generates a pulse signal to alternately turn on and turn off the third switching element, the turning on of the third switching element connecting the first and second diodes to the third smoothing circuit in series, and the turning off of the third switching element connecting the first and second diodes to the third smoothing circuit in parallel.

2. The DC-DC converter according to claim 1, wherein the first and second switching elements of the first and second voltage resonance circuits are connected in one of the bridge type and the push-pull type.

3. A DC-DC converter comprising:
a voltage resonance circuit including first switching elements which are so connected as to be alternatively switched, to which direct-current power is input from a low-voltage direct-current power supply, the voltage resonance circuit converting the direct-current power to an alternative-current power and outputting the alternative-current power
an insulating high-frequency transformer which has a primary side and a secondary side, the output voltage being applied to the primary side from the first voltage resonance circuit;
first and second current resonance circuits which are connected to the secondary side of the first transformer;
first and second rectifier circuits which rectify the output currents output from the first and second current resonance circuits;
first and second smoothing circuits which smooth the output voltages from the first and second rectifier circuits to output first and second output voltages;
a pulse-width modulation circuit which pulse-width-modulates the first and second output voltages from the first and second smoothing circuits, and comprises a first diode connected between the high potential sides of the first and second output voltages, a second diode connected to the low potential sides of the first and second output voltages, and a second switching element connected between the first and second diodes;
a third smoothing circuit which smoothes the output voltage from the pulse-width modulation circuit to output a third output voltage; and
a pulse generator which generates a pulse signal to alternately turn on and turn off the third switching element, the turning on of the third switching element connecting the first and second diodes to the third smoothing circuit in series, and the turning off of the third switching element connecting the first and second diodes to the third smoothing circuit in parallel.

4. The DC-DC converter according to claim 3, wherein the first switching elements of the first voltage resonance circuit are connected in one of the bridge type and the push-pull type.

5. A DC-DC converter comprising:
a voltage resonance circuit including first switching elements which are so connected as to be alternately switched, to which direct-current power is input from a low-voltage direct-current power supply, the voltage resonance circuit converting the direct-current power to an alternative-current power and outputting the alternative-current power;
a first driver circuit which alternately and selectively turns on and turns off the first switching elements at a zero cross timing to maintain the first voltage resonance circuit in a resonance mode, wherein substantially no conductive current is supplied to the first switching element and substantially no voltage is applied to the first switching element at the zero cross timing;
a first and second insulating high-frequency transformer each of which has a primary side and a secondary side, the output voltage being applied to the primary side from the first voltage resonance circuit;
first and second current resonance circuits which are connected to the secondary sides of the first and secondary transformers respectively;
first and second rectifier circuits which rectify the output currents output from the first and second current resonance circuits;
first and second smoothing circuits which smooth the output voltages from the first and second rectifier circuits to output first and second output voltages;
a pulse-width modulation circuit which pulse-width modulates the first and second output voltages from the first and second smoothing circuits, and comprises a first diode connected between the high potential sides of the first and second output voltages, a second diode connected to the low potential sides of the first and second output voltages, and a second switching element connected between the first and second diodes;
a third smoothing circuit which smoothes the output from the pulse-width modulation circuit to output a third output voltage; and
a pulse generator which generates a pulse signal to alternately turn on and turn off the third switching element, the turning on of the third switching element connecting the first and second diodes to the third smoothing circuit in series, and the turning off of the third switching element connecting the first and second diodes to the third smoothing circuit in parallel.

6. The DC-DC converter according to claim 1, wherein the pulse generator includes a photo-coupler which electrically disconnects between the third smoothing circuit and the third switching elements.

7. The DC-DC converter according to claim 1, wherein the low-voltage direct-current power supply corresponds to a fuel cell, a solar cell, or a wind-up generator.

8. The DC-DC converter according to claim 3, wherein the pulse generator includes a photo-coupler which electrically disconnects between the third smoothing circuit and the second switching elements.

9. The DC-DC converter according to claim 3, wherein the low-voltage direct-current power supply corresponds to a fuel cell, a solar cell, or a wind-up generator.

10. The DC-DC converter according to claim 5, wherein the pulse generator includes a photo-coupler which electrically disconnects between the third smoothing circuit and the second switching elements.

11. The DC-DC converter according to claim 5, wherein the low-voltage direct-current power supply corresponds to a fuel cell, a solar cell, or a wind-up generator.

* * * * *